United States Patent
US 12,384,676 B1
Templeton et al.
(45) Date of Patent: Aug. 12, 2025

(54) SYSTEM AND METHOD FOR SUSTAINABLE PROCESSING OF FOSSIL FUELS OR SUBSURFACE COMODITIES TO REDUCE GREENHOUSE GASES WHILE SEQUESTERING AND REPURPOSING ALTERNATIVE ENERGY COMPONENTS

(71) Applicant: BIA Integrated Solutions, Inc., Lakeway, TX (US)

(72) Inventors: Kenneth Templeton, Lakeway, TX (US); Jovan Hutton Pulitzer, Frisco, TX (US); Jon Erik Silzza, Lakeway, TX (US)

(73) Assignee: BIA Integrated Solutions, Inc., Lakeway, TX (US)

( * ) Notice: Subject to any disclaimer, the term of this patent is extended or adjusted under 35 U.S.C. 154(b) by 0 days.

(21) Appl. No.: 19/076,846

(22) Filed: Mar. 11, 2025

(51) Int. Cl.
C01B 3/24 (2006.01)

(52) U.S. Cl.
CPC .......... C01B 3/24 (2013.01); C01B 2203/049 (2013.01); C01B 2203/1241 (2013.01); C01B 2203/1258 (2013.01)

(58) Field of Classification Search
CPC ..... C01B 32/05; C01B 3/24; C01B 2203/049; C01B 2203/1241; C01B 2203/1258
See application file for complete search history.

(56) References Cited

U.S. PATENT DOCUMENTS 4,072,485 A 2/1978 Becdelievre et al.
8,002,854 B2 8/2011 Muradov
(Continued)

OTHER PUBLICATIONS

"Natural Gas Liquids Separation"; The University of Oklahoma Public university in Norman, Oklahoma. (2007) 7 pages.
(Continued)

Primary Examiner — Anthony J Zimmer
Assistant Examiner — Syed T Iqbal

(57) ABSTRACT

A method for tracking processing of natural gas through a hydrogen generation system includes segmenting the input flow of natural gas at the received flow into a predetermined unit of received natural gas (Unit) for tracking of the Unit through the system. The step of segmenting includes measuring the constituent makeup of the received natural gas to determine the molecular structure and molecular weight of each constituent that is contained within the natural gas flow associated with the Unit and determining the volume of the received natural gas that constitutes the Unit based upon the measured amount of each constituent's molecular structure and molecular weight required to define the Unit. The method further comprising separating from the Unit select ones of the hydrocarbons contained therein and measuring the molecular weight of each of the separated hydrocarbons, separating from the Unit all remaining non-selected ones of the hydrocarbons and the non-hydrocarbons associated with the Unit and determining the molecular structure and molecular weight of each constituent in this step of separating and inputting the separated select ones of the hydrocarbons associated with the Unit to a manifold, processing the desired hydrocarbon associated with the Unit output by the manifold associated with the Unit to separate Hydrogen and Carbon atoms into hydrogen gas, $H_2$, and elemental Carbon, measuring the molecular volume of the hydrogen gas, $H_2$, associated with the Unit, measuring the molecular weight of the elemental Carbon associated with the Unit and directing with the manifold the separated select ones of the hydrocarbons associated with the Unit not including the desired hydrocarbon associated with the Unit to route the directed separated select ones of the hydrocarbons associated the Unit to the natural gas line and wherein the molecular volume of each of the directed separated select ones of the hydrocarbons associated with the Unit is measured.

13 Claims, 27 Drawing Sheets

(56) References Cited

U.S. PATENT DOCUMENTS

| | | | |
|---|---|---|---|
| 10,760,010 | B2 | 9/2020 | Dugas et al. |
| 11,453,584 | B2 | 9/2022 | Desai et al. |
| 11,717,784 | B1 | 8/2023 | Santos et al. |
| 12,195,338 | B2 | 1/2025 | Majcher |
| 2008/0289494 | A1* | 11/2008 | Boutot ............. C01B 3/24 95/81 |
| 2011/0023536 | A1 | 2/2011 | Jager et al. |

OTHER PUBLICATIONS

"The turquoise route: Methane pyrolysis to produce hydrogen"; enter for Green Technology & Management, Cochin, India; Jan. 1, 2024; 9 Pages.

ABB Inc.: "Measurements in natural gas applications." Measurement & Analytics; 15 pages.

ABB Inc.: "Portable NGC Analyzer Products Btu, Data Sheet 2101179-A" 4 pages.

Acar, Canan, and Ibrahim Dincer. "Comparative environmental impact evaluation of hydrogen production methods from renewable and nonrenewable sources." Causes, impacts and solutions to global warming. New York, NY: Springer New York, 2013. 493-514.

Amalu, Emeka H., et al. "Critical skills needs and challenges for STEM/STEAM graduates increased employability and entrepreneurship in the solar energy sector." Renewable and Sustainable Energy Reviews 187 (2023): 113776; 17 pages.

Arutyunov, V. "On the sources of hydrogen for the global replacement of hydrocarbons." Academia Letters, Article 3692.; Oct. 2021; 4 pages.

Aunedi, Marko, et al. "System-driven design and integration of low-carbon domestic heating technologies." Renewable and Sustainable Energy Reviews 187 (2023): 113695; 16 Pages.

Barelli, Linda, et al. "Na-seawater battery technology integration with renewable energies: The case study of Sardinia Island." Renewable and Sustainable Energy Reviews 187 (2023): 113701; 9 pages.

Barone, G., et al. "The role of energy communities in electricity grid balancing: A flexible tool for smart grid power distribution optimization." Renewable and sustainable energy reviews 187 (2023): 113742; 17 Pages.

Calise, Francesco, et al. "Dynamic simulation and thermoeconomic analysis of a power to gas system." Renewable and Sustainable Energy Reviews 187 (2023): 113759; 15 pages.

Cavazzuti, Marco, and Michele Bottarelli. "Performance analysis of a multi-source renewable energy system for temperature control in buildings of varied thermal transmittance and climate zone." Renewable and Sustainable Energy Reviews 187 (2023): 113725; 17 pages.

De Nicolás, Amanda Prado, et al. "Desalination, minimal and zero liquid discharge powered by renewable energy sources: Current status and future perspectives." Renewable and Sustainable Energy Reviews 187 (2023): 113733; 16 pages.

Emerson Automation Solutions: "BTU Analysis Using a Gas Chromatograph." RoseMount; 4 pages.

Erlebacher, J. et al.: "Carbon dioxide-free hydrogen and solid carbon from natural gas via metal salt intermediates." ARPA, 2023. 18 pages.

Hayes, Daniel S., et al. "100 key questions to guide hydropeaking research and policy." Renewable and Sustainable Energy Reviews 187 (2023): 113729.

John Hu (PI) "Microwave Catalysis for Process Intensified Modular Production of Carbon Nanomaterials from Natural Gas" U.S. Department of Energy National Energy Technology LaboratoryResource Sustainability Project Review Meeting; West Virginia University (Apr. 3, 2024): 40 pages.

Knott, Josef, et al. "Ecological assessment of the world's first shaft hydropower plant." Renewable and Sustainable Energy Reviews 187 (2023): 113727; 16 pages.

Landes, Joseph E. "BTU Analysis Using a Gas Chromatograph." Southern Petroleum Laboratories, Inc.; 5 pages.

Lenci, Stefano. "Along-wind and cross-wind coupled nonlinear oscillations of wind turbine towers close to 1: 1 internal resonance." Renewable and Sustainable Energy Reviews 187 (2023): 113698; 17 pages.

Marconi, Pietro, and Lorenzo Rosa. "Role of biomethane to offset natural gas." Renewable and Sustainable Energy Reviews 187 (2023): 113697; 10 Pages.

Mirkarimi, S. M. R., et al. "Review of methane cracking over carbon-based catalyst for energy and fuels." Renewable and Sustainable Energy Reviews 187 (2023): 113747; 16 Pages.

Mitoura dos Santos Junior, Julles, et al. "An analysis of the methane cracking process for CO2-free hydrogen production using thermodynamic methodologies." Methane (2022): 243-261.

Pregger, Thomas, et al. "Prospects of solar thermal hydrogen production processes." International journal of hydrogen energy 34.10 (2009): 4256-4267.

Randy O. Litun, P.Eng., et al. "The Potential for Methane Pyrolysis in B.C." Centre for Innovation and Clean Energy (CICE) (Apr. 2024):125 pages.

Renewable & Sustainable Energy Reviews; Managing Executive Editor: A. Foley, Queen's University Belfast, Belfast, Northern Ireland, UK. 1 page.

Sánchez-Bastardo, Nuria, Robert Schlögl, and Holger Ruland. "Methane pyrolysis for zero-emission hydrogen production: a potential bridge technology from fossil fuels to a renewable and sustainable hydrogen economy." Industrial & Engineering Chemistry Research 60.32 (2021): 11855-11881.

Stage, Under Graduated Third, and Omar Mohammed Qambar. "Natural Gas Separators." Jun. 2020; 32 pages.

Suárez-García, Andrés, et al. "Electrospun composite fibers containing organic phase change materials for thermo-regulation: Trends." Renewable and Sustainable Energy Reviews 187 (2023): 113648; 10 pages.

Tran, Andrea, et al. "A New Approach To Natural Gas Separation." The University of Oklahoma Public university in Norman, Oklahoma (May 2009): 16 pages.

Vitchev, D. (2021). "A brief analysis of the physical requirements for converting coal-fired power plants to hydrogen." Academia Letters, Article 2884. https://doi.org/10.20935/AL2884.

Wang, Yuzhuo, and Jun Jie Wu. "Thermochemical conversion of biomass: Potential future prospects." Renewable and Sustainable Energy Reviews 187 (2023): 113754; 15 Pages.

Wilson, Chris and Bagajewicz, Dr. Miguel . "Novel Method for Gas Separation" The University of Oklahoma Public university in Norman, Oklahoma (2008): 19 pages.

Wong, Tan Lo, et al. "Effects of boron-nitride-based nanomaterials on the thermal properties of composite organic phase change materials: A state-of-the-art review." Renewable and Sustainable Energy Reviews 187 (2023): 113730; 23 pages.

Yousefi, Mahdi, and Scott Donne. "Experimental study for thermal methane cracking reaction to generate very pure hydrogen in small or medium scales by using regenerative reactor." Frontiers in energy Research 10 (2022): 971383; 12 pages.

Zheng, Yi, et al. "Model-based economic analysis of off-grid wind/hydrogen systems." Renewable and Sustainable Energy Reviews 187 (2023): 113763; 14 pages.

* cited by examiner

SYSTEM AND METHOD FOR SUSTAINABLE PROCESSING OF FOSSIL FUELS OR SUBSURFACE COMODITIES TO REDUCE GREENHOUSE GASES WHILE SEQUESTERING AND REPURPOSING ALTERNATIVE ENERGY COMPONENTS

TECHNICAL FIELD

The present invention relates to the production of hydrogen for use within fuel cells, power systems and/or alternative fuel/power systems designed to reduce dependence on solid fossil fuels, and more particularly to a system and method for removing carbon and producing hydrogen from natural gas.

BACKGROUND

The creation of hydrogen for use in hydrogen vehicle fuel cells and hydrogen powered utility systems is a currently expensive and capital-intensive process that has not been economically feasible. Large hydrogen producing plants require a large amount of capital resources and government regulations make the opening of such a facility cost prohibitive. Thus, there is a need for the ability to produce hydrogen on a smaller scale, with a smaller environmental footprint and in a manner which transforms environmental punitive and offending methods and techniques into a Green and Sustainable Method that would easily allow the implementation of the infrastructure for producing hydrogen and minimize the amount of government regulation.

Additionally, the production of hydrogen produces carbon which can be captured and destroyed or stored for future use. The tracking of the amounts of carbon removed in the production of hydrogen can be of great benefits to the energy industry that is trying to find ways to provide more green energy with respect to the use of carbon based energy sources.

SUMMARY

The present invention, as disclosed and described herein, in one aspect thereof, comprises a method for tracking processing of natural gas through a hydrogen generation system comprising connecting the system to a natural gas main line to receive natural gas therefrom to me, controlling the flow of natural gas received by the system from the natural gas line and segmenting the input flow of natural gas at the received flow into a predetermined unit of received natural gas (Unit) for tracking of the Unit through the system. The Unit comprised of hydrocarbons of different weights and non-hydrocarbons, which non-hydrocarbons constitute trash gas. The step of segmenting includes measuring the constituent makeup of the received natural gas to determine the molecular structure and molecular weight of each constituent that is contained within the natural gas flow associated with the Unit and determining the volume of the received natural gas that constitutes the Unit based upon the measured amount of each constituent's molecular structure and molecular weight required to define the Unit. The method further comprising separating from the Unit select ones of the hydrocarbons contained therein (all) and measuring the molecular weight of each of the separated hydrocarbons, separating from the Unit all remaining non-selected ones of the hydrocarbons and the non-hydrocarbons associated with the Unit and determining the molecular structure and molecular weight of each constituent in this step of separating and inputting the separated select ones of the hydrocarbons associated with the Unit to a manifold. The manifold operable to selecting one of the separated select ones of the hydrocarbons associated with the Unit as a desired hydrocarbon for processing to separate the hydrogen and carbon from the select desired hydrocarbon to form hydrogen gas, $H_2$, and elemental Carbon in a hydrogen generation process and designating for return to the natural gas main line as green gas the others of the separated select ones of the hydrocarbons associated with the Unit not selected as the desired hydrocarbon, which green gas does not contain the nonhydrocarbons associated with the Unit. The method further comprising processing the desired hydrocarbon associated with the Unit output by the manifold associated with the Unit to separate Hydrogen and Carbon atoms into hydrogen gas, $H_2$, and elemental Carbon, measuring the molecular volume of the hydrogen gas, $H_2$, associated with the Unit, measuring the molecular weight of the elemental Carbon associated with the Unit and directing with the manifold the separated select ones of the hydrocarbons associated with the Unit not including the desired hydrocarbon associated with the Unit to route the directed separated select ones of the hydrocarbons associated the Unit to the natural gas line and wherein the molecular volume of each of the directed separated select ones of the hydrocarbons associated with the Unit is measured.

BRIEF DESCRIPTION OF THE DRAWINGS

For a more complete understanding, reference is now made to the following description taken in conjunction with the accompanying Drawings in which.

DETAILED DESCRIPTION

Figure 1:
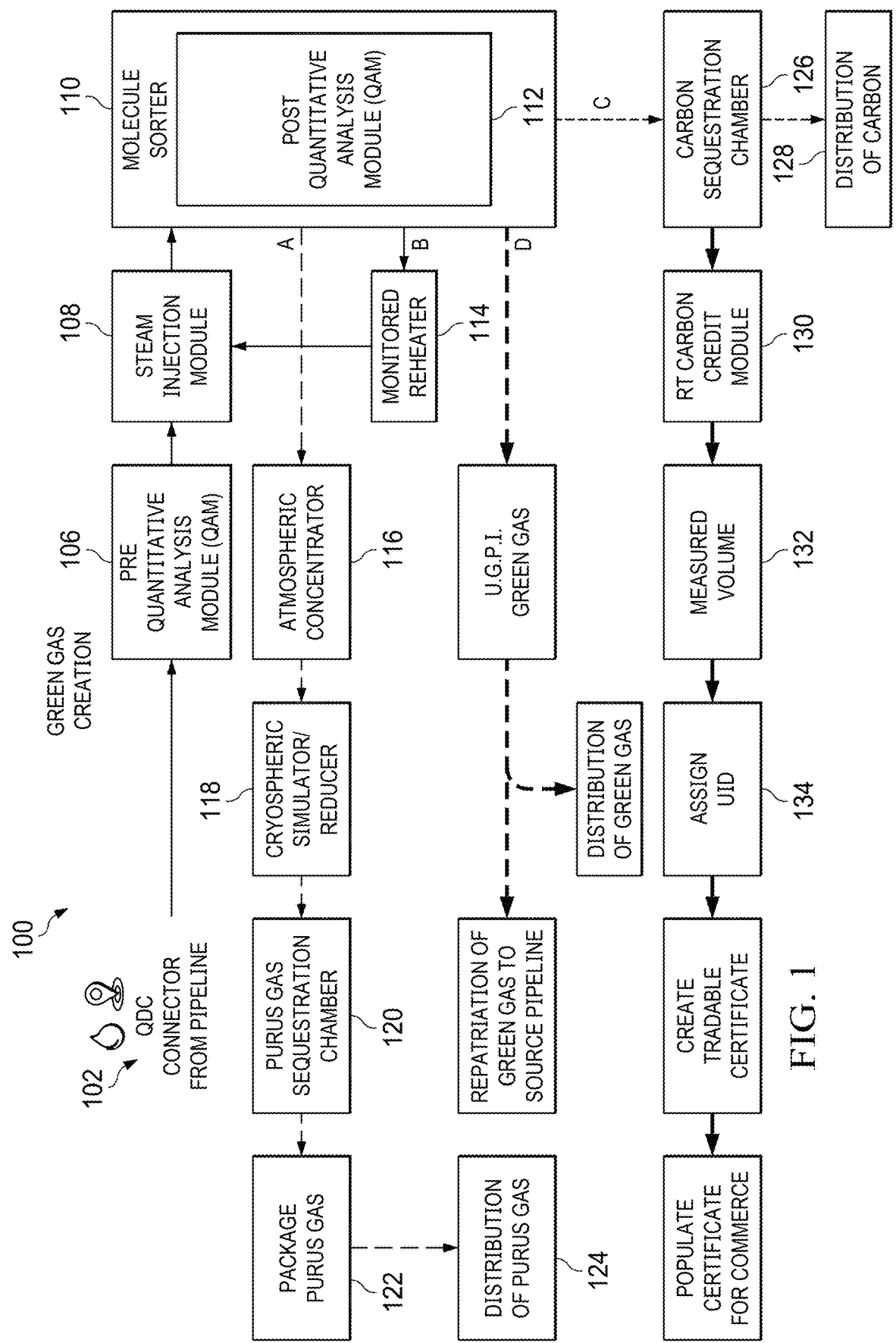
FIG. 1 illustrates an overall view of the system for processing natural gas to remove carbon and hydrogen.

Referring now to the drawings, wherein like reference numbers are used herein to designate like elements throughout, the various views and embodiments of a system and method for processing natural gas to remove carbon and produce hydrogen are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated an overall view of the system 100 for processing natural gas to remove carbon and hydrogen. The system 100 can be implemented in a single 40-foot container or a plurality thereof, or any modularized container which conforms to traditionally and historically established shipping and receiving devices that may be easily moved from site to site. The system 100 only requires a concrete pad, electrical connection, internet or satellite connection and water to begin operation. The modularized container enables mobility and responsiveness with respect to distribution. In some embodiments the modularized container can comprise a 40 foot container. The modularized container will be configured to fit the form factor of existing distribution systems. It will be appreciated that any type of shipping container configuration may be used for containing the system 100 described herein below such as any system meeting the ISO shipping standards. The mobility of the system 100 enables the units to be moved from location to location along a pipeline, at a gas wellhead or any other source hydrocarbon location from with the system may take product to process. Since each concrete pad has its own electrical connection, internet or satellite connection and water and operates independently, the system 100 can be moved interchangeably between the concrete pads.

The system 100 interconnects with a natural gas pipeline or fossilized gas source, through a quick disconnect connector (QDC) 102. The natural gas input via the QDC 102 is provided by system 100. The system 100 includes a pre-quantitative analysis module (QAM) 106. The QAM 106 is responsible for detecting and separating undesirable or trash gases and solid environmental pollutants within the natural gas to separate out the usable gases (hydrocarbons) such as butane, methane, propane, etc. The trash gases may comprise CO2, N2, hydrogen sulfide, water vapor, helium, heavy hydrocarbon gases, ect. that would have deteriorating effects to the processing equipment and pipeline, undesirable constituents. The pre-quantitative analysis module (OAM) 106 analyzes the gases contained within the molecular separator 104 such that the specific constituent parts of the natural gas may be determined by weight and separated from each other. Thus, the amount of carbon contained within the remaining natural gases after the trash gases have been removed may be determined by the pre QAM 106. This information is saved for use and later analysis regarding the removal of carbon from the gases. A selected hydrocarbon based gas within the natural gas provided from the natural gas pipeline may be forwarded for hydrogen and carbon separation while the remaining separated hydrocarbon based gases can be stored for later processing or provided back to the natural gas pipeline.

The selected hydrocarbon based gases are provided to a steam reformation module 108 which can separate the hydrogen and carbon within the selected natural gas from each other. Each separate hydrocarbon based gas can be processed individually such that the operating parameters of the steam reformation module can be optimized for that gas. The following formula defines this process for methane CH$_4$:

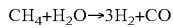

$$CH_4 + H_2O \rightarrow 3H_2 + CO$$

The processed gas in the steam reformation module 108 is provided to a molecular sorter 110 which can separate the removed carbon monoxide from generated hydrogen and remaining gases containing a combination of carbon and hydrogen. Basically, the lighter hydrogen can be separated with a centrifuge, resulting in the lighter hydrogen, the heavier carbon monoxide and a portion of the gas wherein the carbon hydrogen bond was not broken.

The amount of removed carbon as well as the gases still containing hydrogen and carbon may be analyzed by a post quantitative analysis module (OAM) 112 which determines the amount of carbon that has been removed from the processed gas. Additionally, for gases wherein the carbon bond was not broken and still contains carbon and hydrogen within the gas, the post QAM 112 may determine whether further gas processing is necessary. If so, the gas to be reprocessed is provided to a monitored re-heater 114 and after reheating is forwarded to the steam reformation module 108. Further, the water in the steam utilized for the steam injection process of the steam reformation module 108 is also returned in the reheater 114. The amount of hydrogen and carbon produced by the steam reformation module 108 may be increased or decreased as needed based upon a control input. The production may be decreased in one embodiment to maintain the hydrogen production in a 4800-5000 kg range to avoid federal regulations for production greater than 5000 kg. The increase and decrease of hydrogen and carbon production may also be controlled responsive to transportation and storage cost considerations. It is noted that "production" refers to storage for distribution. If the H2 is burned off or used to power a Hydrogen Fuel Cll to provide electricity for the operation of the system, this does not factor into the production quota.

In addition to reprocessing carbon and hydrogen containing gases, the molecular sorter 110 will provide extracted hydrogen gas for further processing to enable its sale and distribution as the production output. The processed hydrogen is provided to an atmospheric concentrator 116 where the hydrogen is compressed to a first pressure level. The compressed hydrogen from the atmospheric concentrator 116 is further compressed by a cryospheric simulator/reducer 118 to a second pressure level. The compressed gas is stored within a sequestration chamber 120 and may be packaged within a packaging facility 122 before distribution at 124. The stored hydrogen is maintained within a gaseous state during production and storage within the system 100 to assist in hydrogen transportation and distribution. The molecular sorter 110 also provides a portion of gas that still has carbon and hydrogen bonds. However, this gas will have some of the carbon removed and may be referred to a green gas due to removal of the trash gases. This green gas can be stored for future use or provided back to the entity providing the source natural gas.

The carbon monoxide removed by the molecular sorter 110 is stored within a carbon sequestration chamber 126. The removed carbon monoxide may be distributed as desired at 128. Additionally, a carbon credit module 130 may take the removed carbon amounts within the carbon sequestration chamber 126 to develop carbon credits. The carbon credit module 130 processes the carbon to determine its measured volume at step 132. This particular amount of carbon is assigned a unique identification number (UID) at 134. A tradable carbon certificate 136 is created and this created certificate is populated with information from the amount of carbon that was extracted from the gas at 138. This will be described in more detail hereinbelow.

Figure 2:
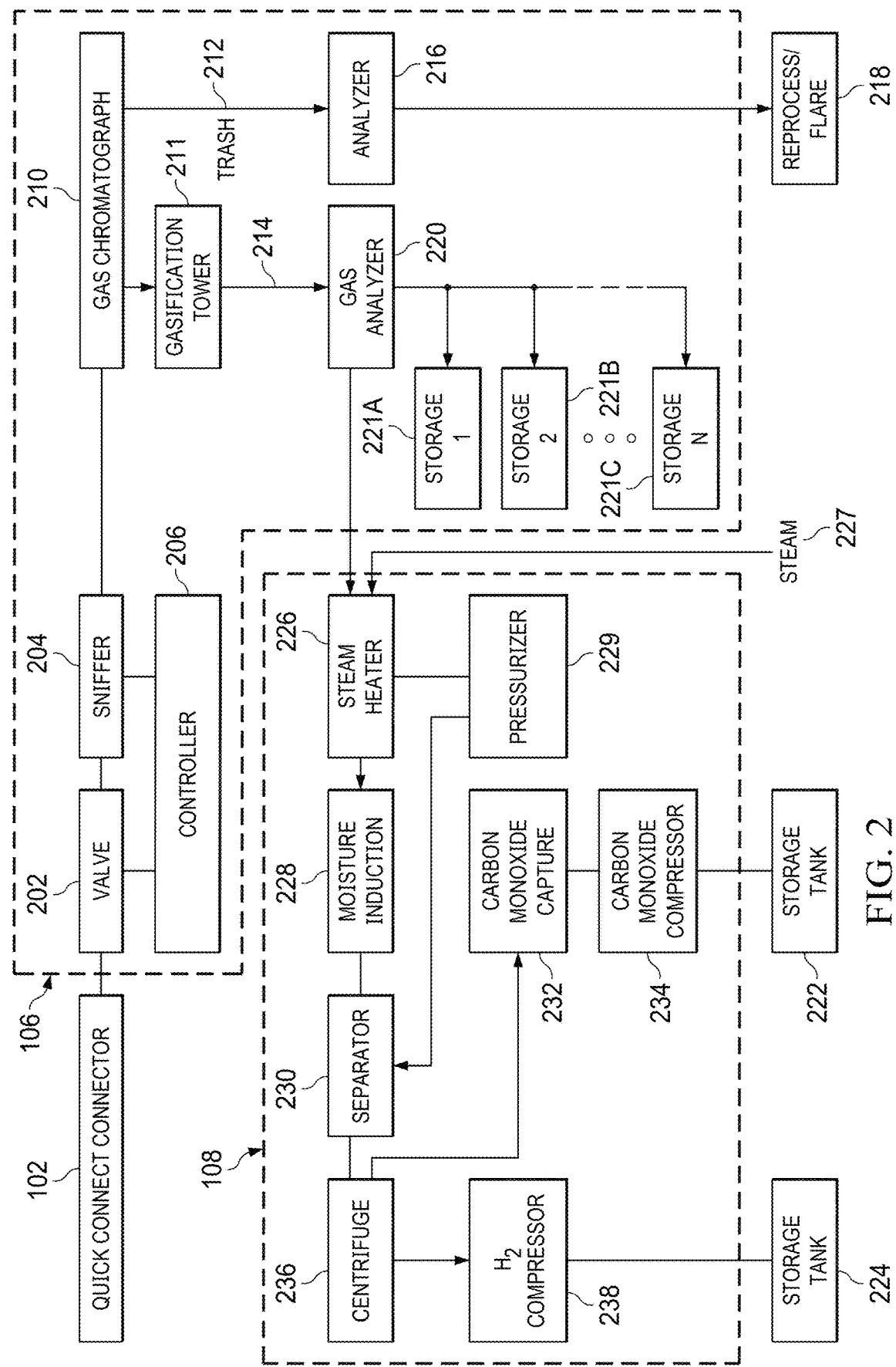
FIG. 2 illustrates a more detailed view of the system of FIG. 1 for processing natural gas to remove carbon and hydrogen.

Referring now to FIG. 2, there is more particularly illustrated the system 100 for processing natural gas to remove carbon and hydrogen. As noted, the quick disconnect connector (QDC) 102 enables the system 100 to connect to a natural gas line. A QDC 102 comprises a quick disconnect fitting for interconnection with hoses or piping and is also referred to as a quick connect fitting or push fitting. The QDC 102 is a coupling used to provide a fast, make-or-break connection to gas or liquid transfer lines. Operated by hand, quick connect fittings replace threaded or phalange connections, which require wrenches. When equipped with self-sealing valves, a QVC 102 will, upon disconnection, automatically contain any fluid or gas in the line.

The natural gas passes through the quick disconnect connector 102 and enters the molecular separator system 100 to a pre QAM 106. pre QAM 106 includes a valve 202 enabling entry of the natural gas into the pre QAM 106. The valve 202 comprises a pressurized one-way valve that controls the entry of natural gas into the pre QAM 106. Within the pre QAM 106, a determination of the types of hydrocarbon based gases received through the valve 202 is made by an electronic molecular sniffer 204. Electronic molecular sniffer 204 detects the presence of particular types of hydrocarbon based gases and trash gases and provides this information to a controller 206. The controller 206 additionally controls the operation of the input valve 202

Figure 3:
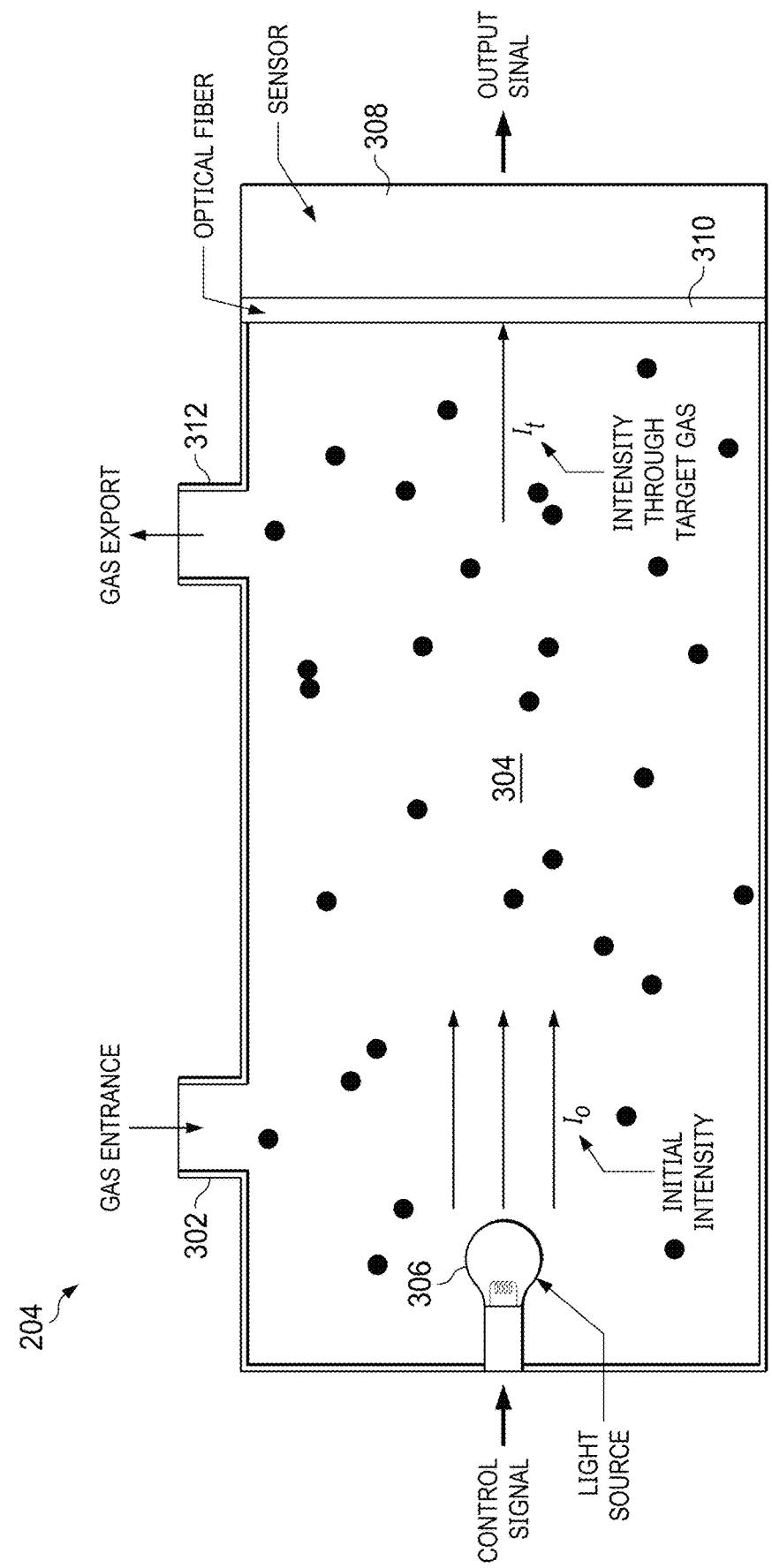
FIG. 3 illustrates an electronic molecular sniffer.

Referring now to FIG. 3, there is illustrated an electronic molecular sniffer 204. The natural gas from the natural gas line is provided to a gas entrance 302 within the electronic molecular sniffer 204. The gas is held within a chamber 304 defined within the electronic molecular sniffer 204, a plurality of light sources 306 are shined through the gas contained within the chamber 304, and an intensity of the light at its initial intensity $I_o$ when leaving the light sources 306 and the intensity of the light It after it has passed through the gases within the chamber are determined.

The initial intensity $I_o$ of the light sources 306 are known while the measured intensity It through the gas within the chamber 304 is measured by a sensor 308 after the light from the light sources 306 have passed through an optical filter 310. The gas within the chamber 304 may then exit the chamber through an exit port 312. The information from the optical sensor 308 is passed to the controller 216. By including multiple light sources 306, the sensor 308 may provide three or more points of data. The electronic molecular sniffer 204 uses light spectrums and electronic frequencies directed by modeling software within the controller 206 to identify the contents of the natural gas within the chamber 304. This provides greater detail of the makeup of the natural gas within the chamber 304. The ability to determine the molecular makeup from more than one source point of light 306 provides more auditable and actionable data that enables the processing of larger volumes of natural gas at a faster rate. This allows a quantitative analysis to be performed such that the actual weight of the gases can be determined. For example. The amount of methane gas (CH4) can be determined, the weight thereof and as such the weight of the carbon. Knowing the carbon weight of the input gas is used to determine the actual reduction of carbon from the initial natural gas input.

Information provided to the controller 206 enables a determination of the volume of the carbon and the hydrogen gases and the trash gases or airborne materials may reside within the provided natural gas. Identification of the trash gases and airborne materials allows for removal of these that do not need to be processed within the steam reformation module 108. The controller 206 may provide information regarding 95 to 99% audible information on the contents of the gas that are coming in off the pipeline. This enables the contents to be determined for any location on the pipeline rather than assuming the gas content is consistent over the entire length of the pipeline as is currently done. To provide more volume through the molecular separator system 100, multiple pre QAMs 106 may be daisy chained to allow for more natural gas processing as demands increase.

The pre-quantitative analysis module (QAM) 106 enables separation of the natural gas into its multiple hydrocarbon based gas constituents (i.e. methane, propane, butane, etc.) as well as trash gases and analysis of the hydrocarbon based gases and trash gases provided from the pipeline in order to determine exactly how much carbon is contained within various gases prior to processing by the steam reformation module 108. Within the pre-QAM 106, the input natural gas is provided to a gas chromatograph 210 and gasification tower 211. The gas chromatograph 210 and gasification tower 211 will work together to separate the trash gases 212 along with the pollutant materials from the multiple carbon and hydrogen based gases 214 that will be either be pushed into the steam methane reformation processing module 108 or stored within storage tanks 221. The trash gases and pollutant materials 212 will be analyzed using an analyzer 216 to determine their volumes and potential value prior to being routed to either holding vessels, for storage, a pipeline for transport or burning as shown generally at 218.

Similarly, the hydrocarbon based gasses 214 will be analyzed by a gas analyzer 220 to determine the amounts of gases that are present and the amount of carbon contained within these gases. The amount of carbon contained within the gases may then be stored to enable a provide an indication of carbon amounts before carbon and hydrogen separation. One of the gases, normally methane, is then provided to the steam reformation module for carbon and hydrogen separation as more fully described herein below. The remaining carbon gases that are not processed by the steam reformation module 108 are separately stored within associated storage tanks 221. Each separated gas is stored in a separate tank where gas 1 goes to tank 221A, gas 2 goes to tank 221B, ect.

Figure 4:
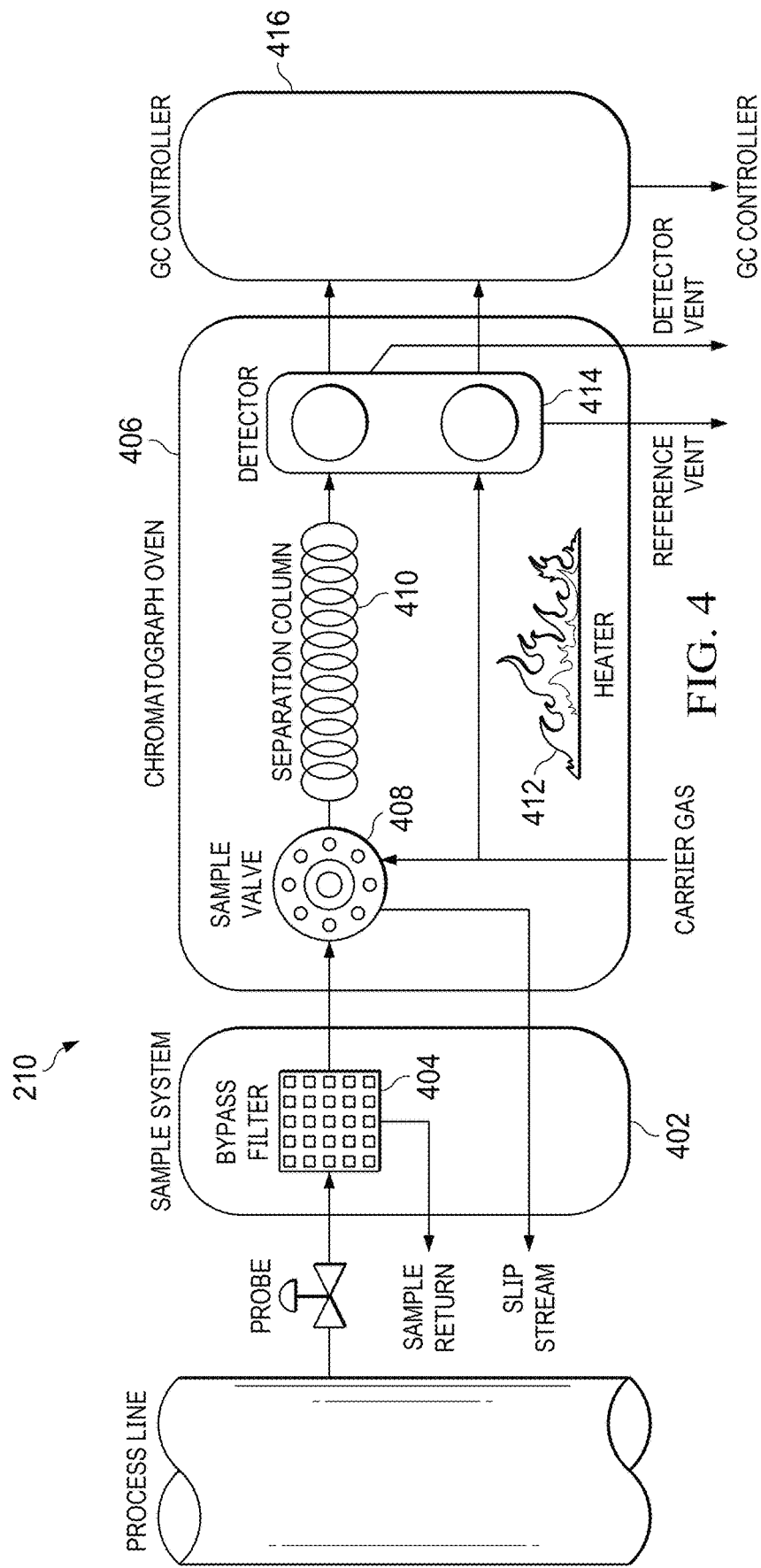
FIG. 4 illustrates one example of a gas chromatograph which may be used for separating the gases.

Referring now to FIG. 4 there is illustrated one example of a gas chromatograph 210 which may be used for separating the gases. Gas chromatography is normally employed for the calculation of the heating value. However, when the gas chromatograph 210 runs an analysis, we not only get the heating value, but other valuable information such as gas composition and relative density. This additional information is used in the gas volume calculations. Gas chromatographs (GCs) 210 have been widely used in hydrocarbon processing facilities when high-quality product specifications are required, or when rigid custody transfer standards are needed for natural gas trading. Gas chromatography is a scientific method in which a gas sample is separated into its component parts for measurement. The gas chromatograph 210 consists of subsystems that inject the sample, separate the sample, detect the components, integrate the peaks, and report the results. The injection, separation, and detection all occur in the heart of the GC 210 known as the GC oven 406. The integration and calculation of results are done in the controller which can be considered the brains of the system. Commercial gas chromatographs are devices such as the Emerson® Rosemont™ 700XA.

Referring further to FIG. 4, the chromatograph oven 406 uses gas chromatography functions by precisely controlling the temperature around the separation column 410. This allows the different components of a vaporized sample of the natural gas to separate based on their interactions with the separation column 410 as the gases travel through at different speeds. This leads to their identification and quantification. The chromatograph oven 406 provides a stable thermal environment to optimize the separation process by varying the temperature depending on the sample composition and desired analysis. The natural gases are input through a sample system 402 that includes a bypass filter 404 for filtering the gases prior to provision to a chromatograph oven 406 through a sample valve 408. The gases are then passed through a separation column 410 where they are heated by a heater 412 within the chromatograph oven 406 to separate the gases. A detector 414 detects the separated gases and routes the detected gases to a desired location under the control of a controller 416.

The separated carbon and hydrogen based gases 214 are provided to a gas analyzer 220 such that the total amount of carbon currently within the preprocessed natural gases can be determined. This information is stored for later processing and analysis after the hydrogen and carbon separation process. This information may also be used to determine which gases are provided on to the steam reformation module 108 to have the carbon removed therefrom or are stored within a storage tank 221 for processing at a later time once a sufficient volume of gas is obtained to make processing cost effective. The separated carbon and hydrogen based gases then input to the steam reformation module 108 in order to enable the separation of the carbon and hydrogen from the gases.

The gas analyzer 220 can analyze any stream of gas in the system to determine the amount of Carbon in the various hydrocarbon compounds and other carbon compounds such as CO2, and the makeup of the gas as to other constituents such as H2S, etc. In the raw natural gas feed, there are typically multiple gasses and liquids, although each provider to the natural gas feed will have cleaned up the natural gas before insertion. However, each provider can vary. Natural gas is a naturally occurring gas mixture, consisting mainly of methane. In one example, consider gas supplied to Union Gas, which is mostly supplied from western Canada, but some gas is supplied from other sources, including the United States and Ontario producers. While the gas from these sources has a similar analysis, it is not entirely the same. Table 1 below outlines the typical components of natural gas on the Union Gas system and the typical ranges for these values (allowing for the different sources).

Note that there is no guarantee of the following composition at any location or as an overall system average. Since the different gas supplies enter the Union Gas system at different locations, the exact composition at any site will vary among the different regions. The system average heating value will depend on the mix of gas supplies (which is increasingly controlled by our customers), and therefore can vary from the typical value listed below.:

TABLE 1

| Component | Typical Analysis (mole %) | Range (mole %) |
|---|---|---|
| Methane | 94.9 | 87.0-96.0 |
| Ethane | 2.5 | 1.8-5.1 |
| Propane | 0.2 | 1-1.5 |
| iso-Butane | 0.03 | 0.01-0.3 |
| normal-Butane | 0.01 | 0.01-0.3 |
| iso-Pentane | 0.01 | trace-0.14 |
| normal-Pentane | 0.01 | trace-0.04 |
| Hexanes plus | 0.01 | trace-0.06 |
| Nitrogen | 1.6 | 1.3-5.6 |
| Carbon Dioxid | 0.7 | 0.1-1.0 |
| Oxygen | 0.02 | 0.01-0.1 |
| Hydrogen | trace | trace-0.02 |
| Specific Gravity | 0.585 | 0.57-0.62 |
| Gross Heating Value (MJ/m3), dry basis | 37.8 | 0-40.2 |

There will also be trace amounts of Hydrogen Sulfide ($H_2S$), maybe in the order of 0.25-0.3 g/100 scf (6-7 mg/m$^3$).

Figure 5A:
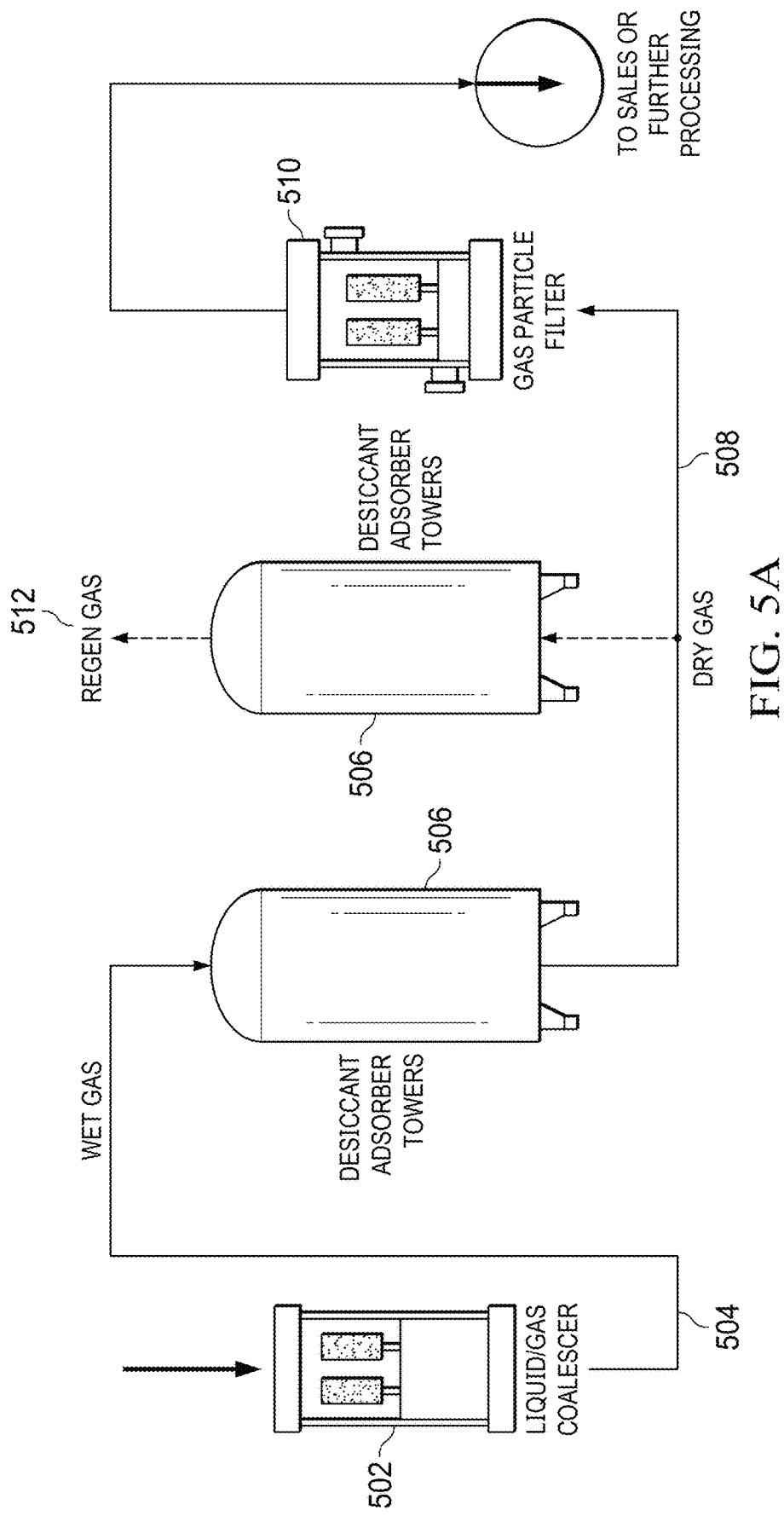
FIG. 5A illustrates the manner in which the trash gases may be processed for further processing.

Referring now to FIG. 5A, there is illustrated the manner in which the trash gases may be processed at 218 for further processing. The trash gases are further processed to determine volume and makeup within the analyzer 216 before the trash gases are output to be either separated into usable materials or disposed of at 218. The trash gases are provided to a liquid/gas coalescer 502 that coalesces the trash gases into a wet gas 504 that are input to desiccant absorber towers 506 to remove the water therefrom. This dry gas 508 is provided to a gas particle filter 510. Gas determined to be of no value will become Regen gas 512 and returned into the natural gas pipeline. The Regen gases 512 may be referred to as a green gas since they have had the carbon based gases removed from the trash gases. This will enable the natural gas providers to claim to have natural gas with a lower carbon footprint, i.e., since trash carbon based gas like CO2 is removed. It is noted that the various makeup of the trash gas and the Carbon content thereof is measured so as to have knowledge of what was removed from that particular natural gas feed.

Figure 5B:
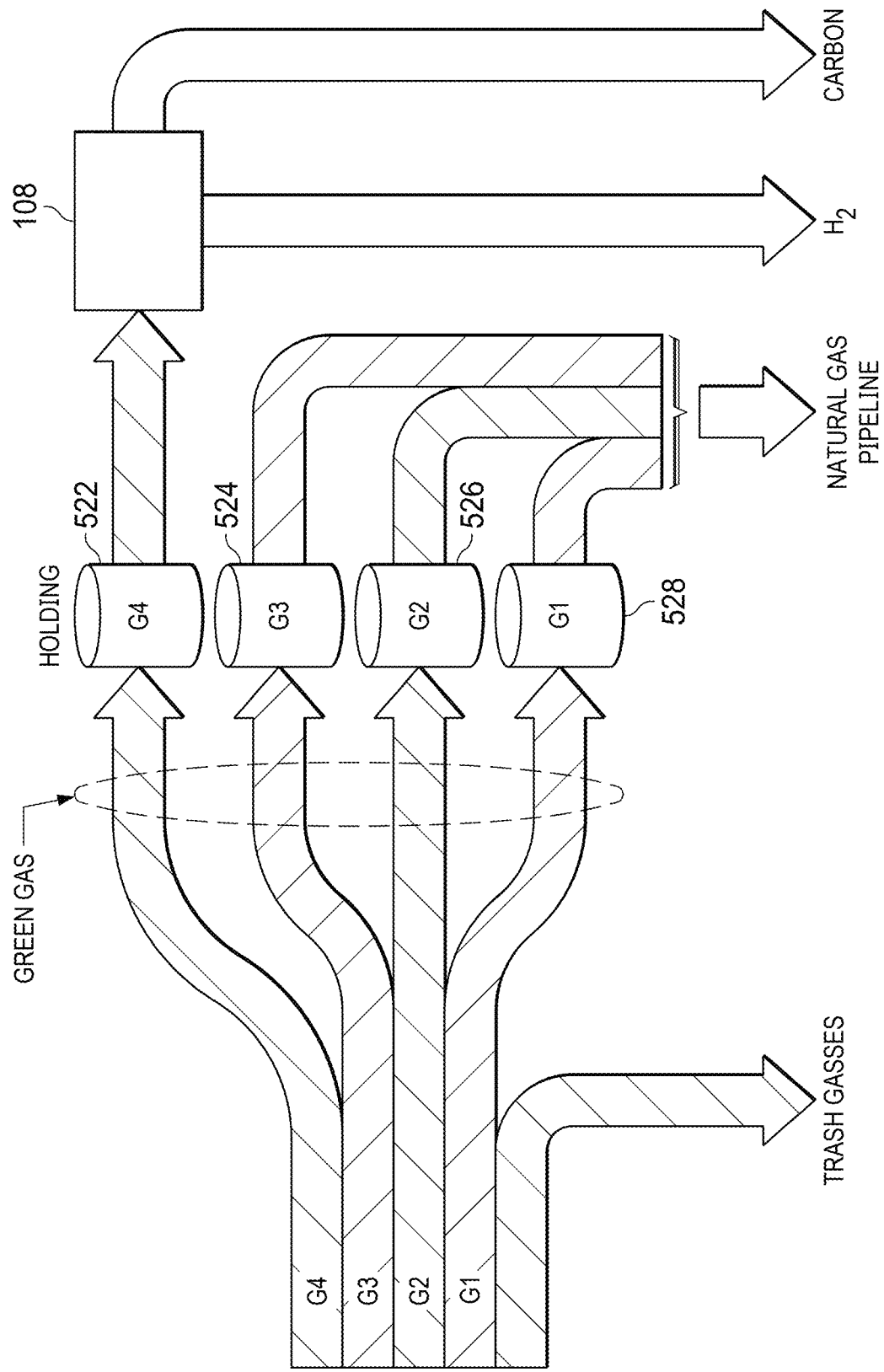
FIG. 5B illustrates separation of various carbon based gases and trash gases within a gasification tower before hydrogen and carbon separation.

Referring not to FIG. 5B, there is illustrated the manner in which the natural gas is separated by the gasification tower 211 and gas chromatograph 210. The natural gas pipeline 520 provides natural gas containing multiple hydrocarbon based gases G1, G2, G3 and G4. The gasification tower 211 and gas chromatograph 210 separate each of the gases G1, G2, G3 and G4 into a separate hydrocarbon based gas. Gas G4 is stored in a buffer tank 522 and then provided to the steam reformation module 108 to separate the G4 gas into Hydrogen and Carbon. Each of the other hydrocarbon based gases G1, G2 and G3 are stored in buffer tanks 524-528 and may be later processed by a reconfigured steam reformation module 108 or reinserted as a green gas having a smaller percentage of carbon due to the removal of trash gases into the natural gas pipeline.

Referring now back to FIG. 2, the selected gas from the pre-QAM 106 is input to the steam reformation module 108. The steam reformation module 108 performs steam methane reforming (SMR) comprising a method for producing syngas (hydrogen and carbon monoxide) by reacting hydrocarbons with water. Steam methane reforming (SMR) is a chemical process where methane from natural gas reacts with high-temperature steam to produce hydrogen gas and carbon dioxide. The reaction within the steam reformation module 108 is represented by the equation:

$$CH_4 + H_2O \rightleftharpoons CO + 3H_2$$

The reaction is strongly endothermic reaction ($\Delta H_{SR}$=206 kJ/mol).

Then, the CO has to be processed via the water-gas shift reaction (WGSR), wherein additional hydrogen is released by reaction of water with the carbon monoxide generated according to equation [1]:

$$CO + H_2O \rightleftharpoons CO_2 + H_2$$

This requires $\Delta H_{WGSR}$=−41 kJ/mol

In the present system 100 the removed carbon dioxide will be stored in a storage tank 222 as will the separated hydrogen within a storage tank 224.

The hydrocarbon-based gases from the pre-QAM 106 are provided to a moisture induction unit 228 where the gas is moisture induced with steam provided from the steam heater 226 that heats water 227 provided to the steam heater 226. The steam is provided from the steam heater 226 to the moisture induction unit 228 and the steam heated gas is then processed at a separator 230 to break the hydrogen carbon bonds. The carbon monoxide and hydrogen along with any remaining gas are separated within a centrifuge 236. Output from the centrifuge 236 is captured as carbon monoxide by a carbon monoxide capture unit 232. The captured carbon monoxide from the carbon monoxide capture unit 232 is compressed at a compressor 234 before storage within a storage tank 222. The removed hydrogen is also provided to the hydrogen gas compressor 238. The compressed hydrogen gases are placed within a storage tank 224. The compressed hydrogen gases remain in a gaseous rather than a liquid form for both storage and transportation.

Figure 6:
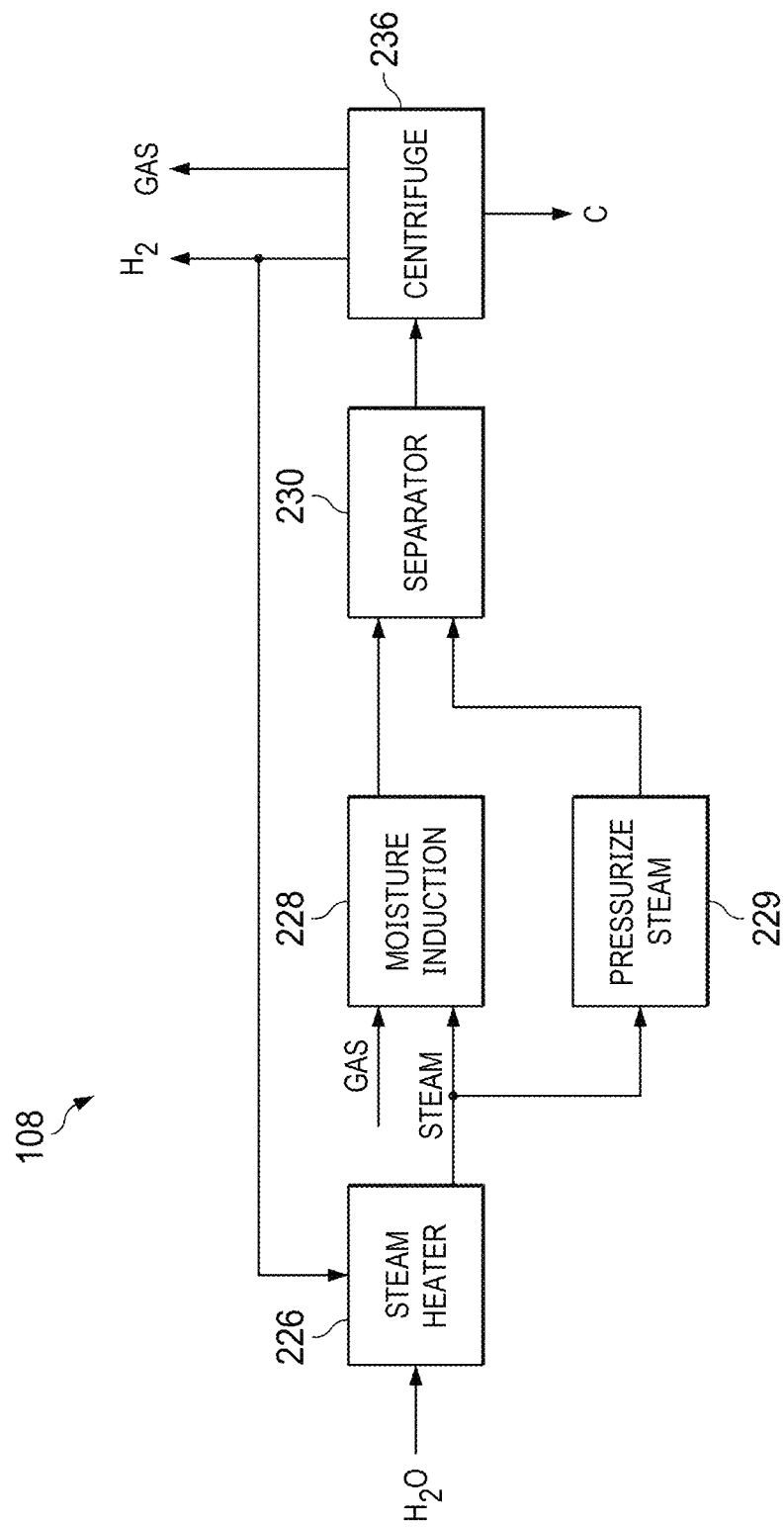
FIG. 6 illustrates the structure of the steam reformation module.

Referring now to FIG. 6, there is more particularly illustrated the structure of the steam reformation module 108. As noted above, the steam 228 is input to the preheater (steam reheater) 226. The steam heater 226 receives water that is output as steam to 2820 moisture induction module 228 into a steam pressurization unit 229 the moisture induction module 228 moisturizes the inserted natural gas using moisture induction. Having the gas infused with moisture makes the separation process easier. The moisturized gas is provided to a separator 230 along with steam that has been pressurized at the steam pressurization unit 229. The pressurized steam causes the carbon and hydrogen within the gas to break apart and they are then separated within a centrifuge 236. The centrifuge 236 separates the components of the gas into carbon, hydrogen and natural gas portions that still containing carbon and hydrogen connections.

The centrifuge 226 allows the heavier carbon and the lighter hydrogen to be separated with the gas still having carbon and hydrogen connection located in between. The hydrogen being the lightest gas will flow to the top of the centrifuge 226 and will be siphoned off and compressed by a compressor 238 before storage within a storage tank 224. The carbon will be located in lower levels of the centrifuge 226 and will be siphoned off as well by the carbon capture unit 232. Both the carbon and hydrogen produced will be further analyzed by different sections of the molecular sorter 110 described herein below. The gas still having carbon and hydrogen bonds may also be separated for further steam processing. Alternatively, the gasses still containing carbon and hydrogen bonds may be reinjected into the natural gas pipeline. Since these gas have had the trash gasses removed from them, they comprise a "green gas" or cleaner gas than was originally provided by the natural gas pipeline. This will have the effect of diluting the carbon amounts within the natural gas pipeline and provide an overall cleaner gas within the natural gas pipeline. The reinserted gas having removed trash gases will also improve the deterioration effects caused by the trash gases.

Figure 7:
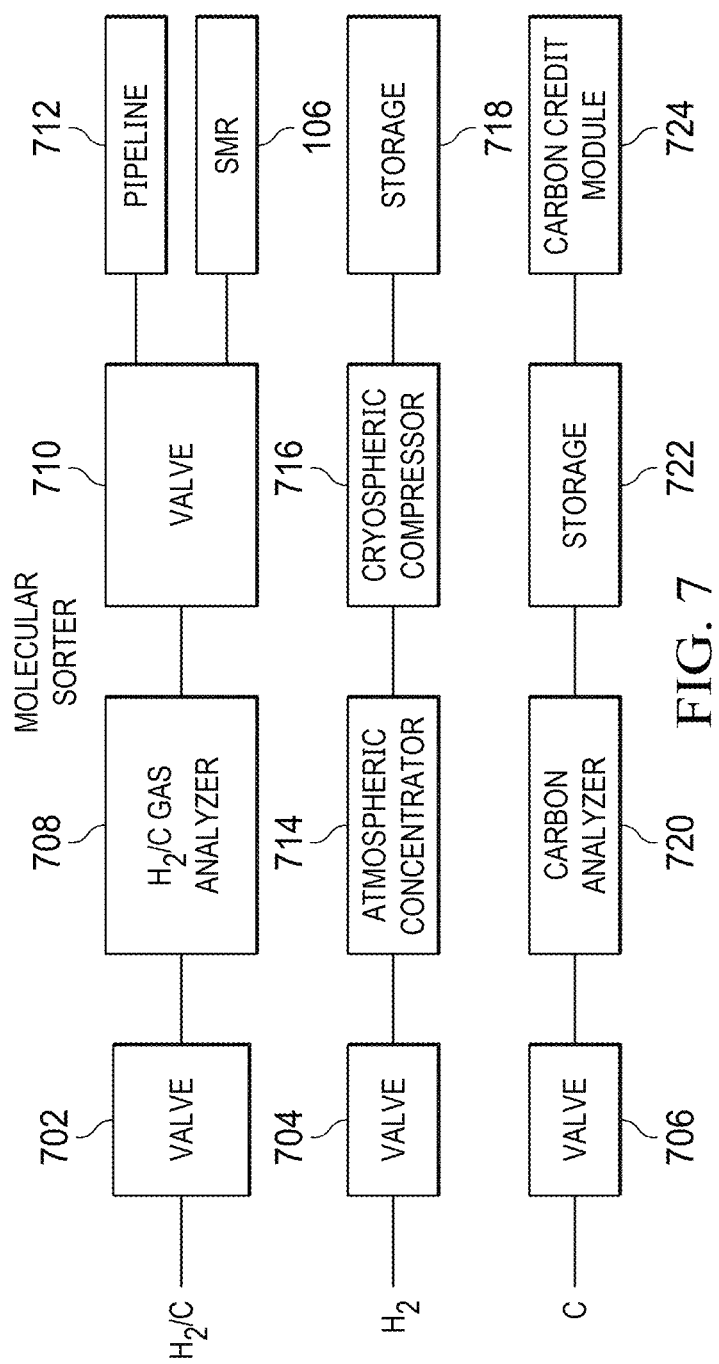
FIG. 7 illustrates illustrated a block diagram of the molecular sorter including the post quantitative analysis module (QAM)

Referring now to FIG. 7, there is illustrated a block diagram of the molecular sorter 110 including the post quantitative analysis module (QAM) 112. The molecular sorter 110 identifies the volume of hydrogen and carbon that has been separated in the steam reformation module 106 of the process. The molecular sorter 110 will include a number of valves 702, 704 and 706 for providing separated gases to the molecular sorter. Valve 702 admits gases still containing mixtures of carbon and hydrogen that may need to be further processed. A gas analyzer 708 analyzes the carbon bearing gasses to determine if the gases should be further processed. If the gas analyzer 708 determines that the gases should be further processed, a valve 710 is opened to route the gases back to the steam reformation module 106 to enable the gases to be further steam processed as described hereinabove previously. If the gas analyzer 708 determines that further processing would not be beneficial, the valve 710 is controlled to route the gases back to the pipeline 712. Separated hydrogen gases are received from the storage tank 224 associated with the steam reformation module 108 through valve 704. The hydrogen gases are routed to an atmospheric concentrator 714 that compresses the gases to a minimum of 700 bars or 10,153 psi to be dispensable. The hydrogen to be utilized as vehicle fuel must be compressed to a minimum of 700 bars or 10,153 psi to be dispensable. A cryospheric compressor 716 connected to the output of the atmospheric compensator 714 provides a second compression taking the hydrogen to 900 bars or 13,054 psi that will provide a step down cryogenics function as the hydrogen is packaged into the distribution modules. This pressure allows for quicker fueling for vehicles and the volume of gas can be placed in a storage cylinder 718. Carbon gas from the storage tank 222 enters the molecular sorter 110 through a one-way valve 706. Carbon is analyzed by a carbon analyzer 720 to determine the amount of carbon that was removed from the processed gas. Based upon the removed value determined from post steam injection processing and the determine value prior to steam injection processing, the exact amount of removed carbon can be determined by the carbon analyzer 720. This removed carbon can then be stored within a storage system 722 and the stored carbon may then be used for creating carbon credits using a carbon credit module 724.

Figure 8:
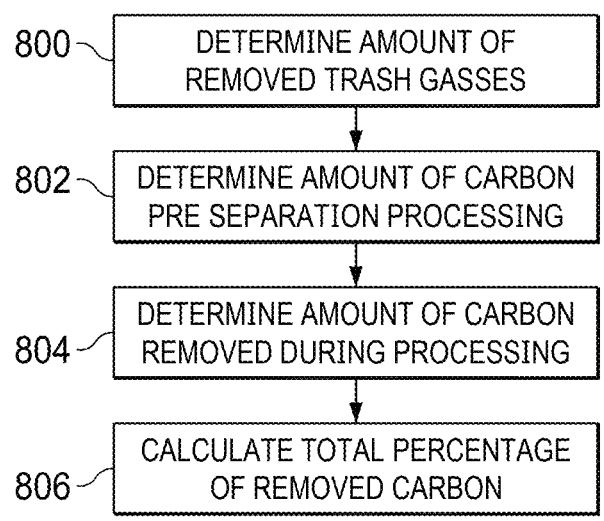
FIG. 8 illustrates a flow diagram of the process by which the total percentage of carbon removed from natural gas may be determined by the pre-quantitative analysis module.

Referring now to FIG. 8, there is illustrated a flow diagram of the process by which the total percentage of carbon removed from natural gas may be determined by the pre-quantitative analysis module 106. Initially, the amount of carbon contained within the removed trash gases is determined at step 800. The pre-quantitative analysis module 106 determines at step 802 the amount of carbon contained within the separated hydrocarbon-based gasses prior to separation processing within the steam reformation module 108. Once the separation of the carbon and hydrogen has been completed within the steam reformation module 108, the post quantitative analysis module 112 within the molecular sorter 110 may determine at step 804 the amount of carbon that has been removed during the steam reformation module processing and the removal of the trash gases. Based upon these pre- and post-determined amounts, a calculation may be made of the total percentage and amount of removed carbon from the natural gas at step 806.

Figure 9A:
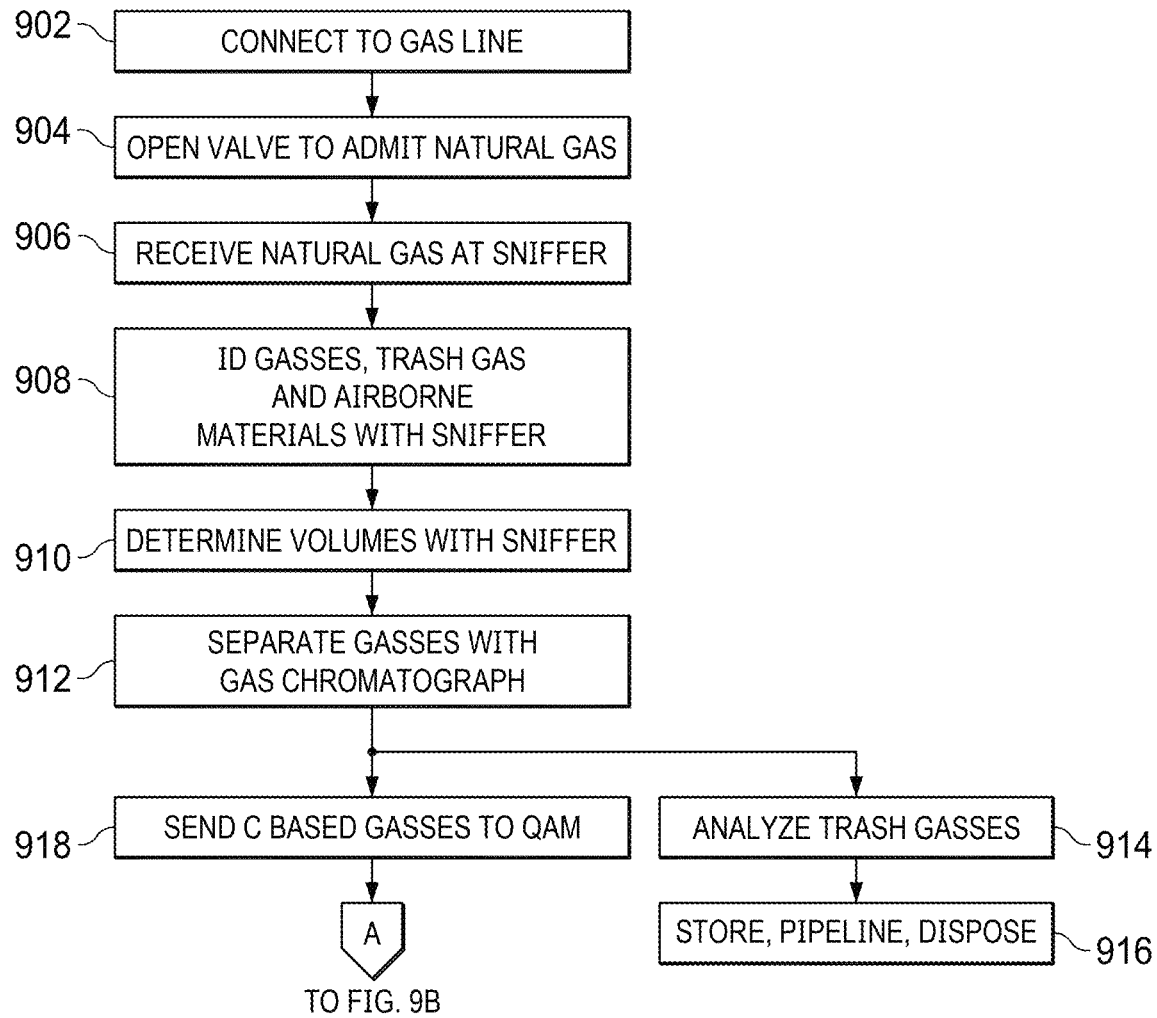
FIGS. 9A-9C illustrate the process for processing natural gas to remove carbon and trash gases therefrom and producing hydrogen.
Figure 9B:
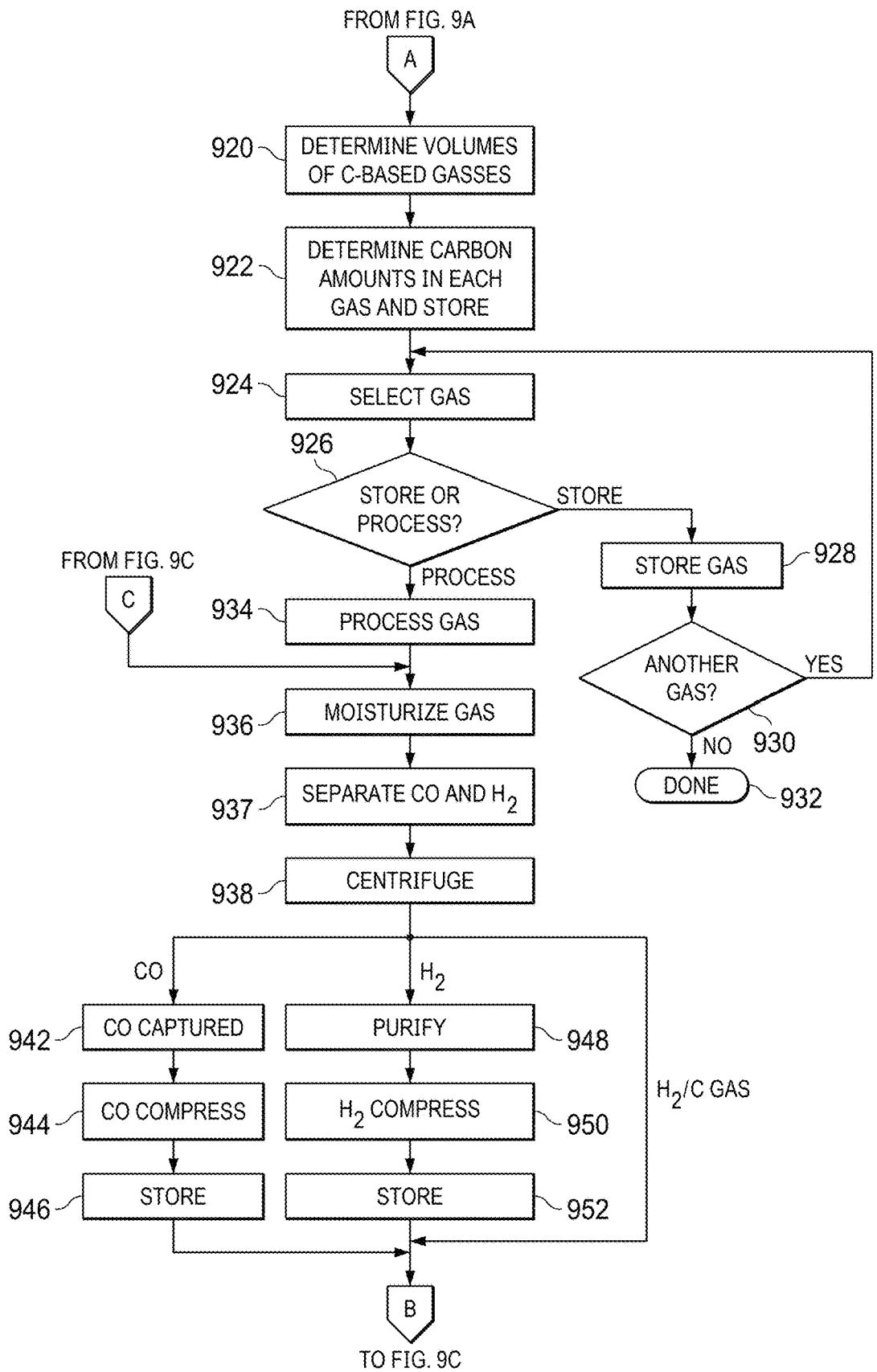
Figure 9C:
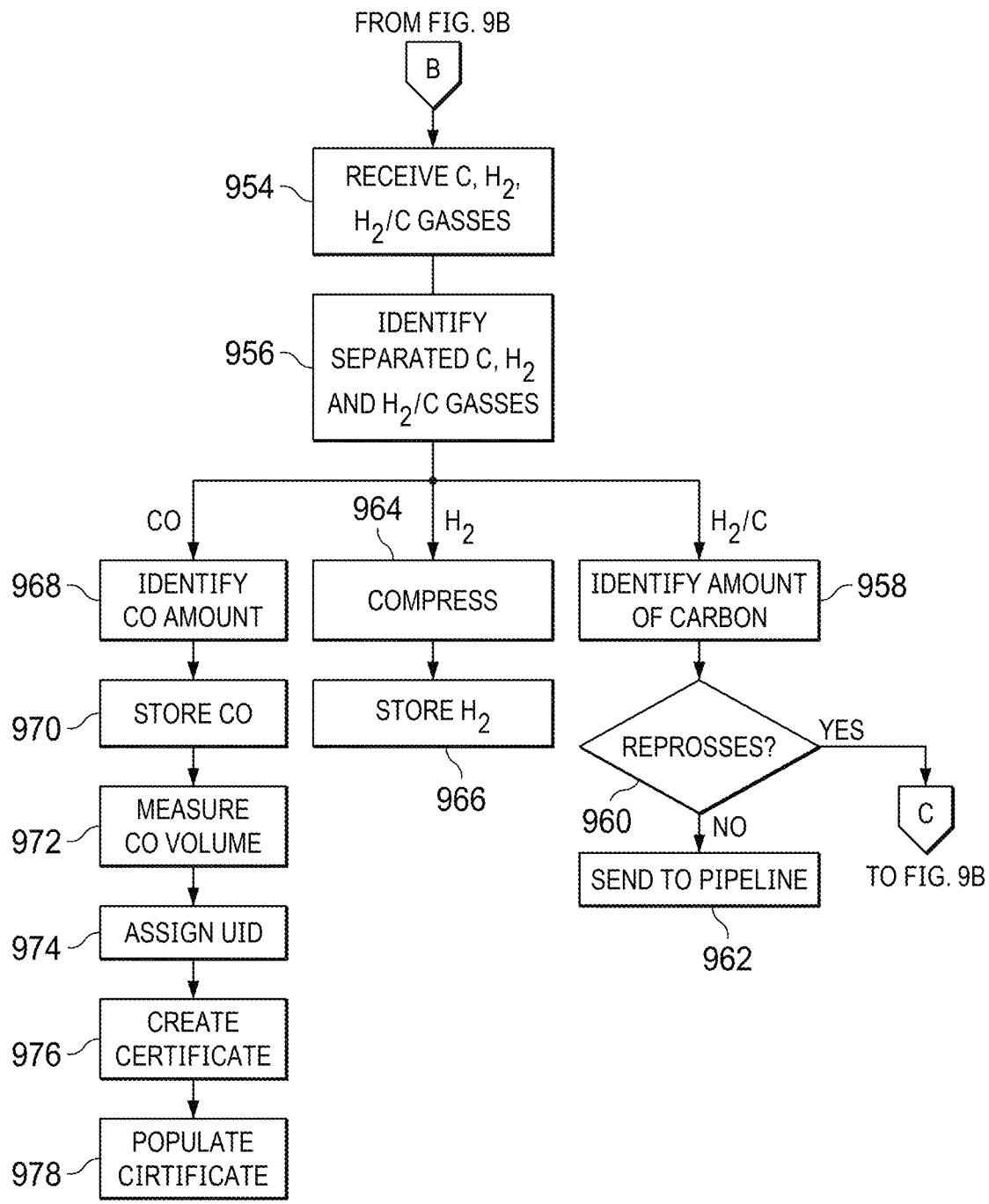

Referring now to FIGS. 9A-9C there is illustrated the process for processing natural gas to remove carbon and trash gases therefrom and producing hydrogen. The process is initiated by connection at step 902 of the system 100 to a natural gas line via a quick connect connector 102. Once connected to the to the connector 102, a pressurized valve 202 is opened to admit natural gas into the molecular separator 104. The admitted natural gas is received at step 906 at an electronic molecular sniffer 204 within the molecular separator 104. The electronic molecular sniffer 204 identifies at step 908 the gases, trash gases and airborne materials contained within the natural gas. The electronic molecular sniffer 204 also determines at step 910 the volumes of the identified gases and materials within the natural gas. The identified gases are separated at step 912 from each other using a gas chromatograph and gasification tower within a pre-QAM module 106. The separated trash gases are analyzed at step 914 to enable a determination of whether to store the trash gases, transmit them back to a pipeline or dispose of them by burning them off or other disposal techniques and the amounts of carbon therein at step 916.

The separated hydrocarbon-based gases are analyzed by the gas analyzer 220 to determine at step 920 the volume of and types of the hydrocarbon-based gases contained within the natural gas. The gas analyzer 220 additionally determines at step 922 the amount of carbon contained within each of the seperated hydrocarbon-based gases. Based upon the amounts of hydrocarbon-based gases that are available, a particular hydrocarbon based gas for processing within the steam reformation module 108 is selected at step 924. Inquiry step 926 determines whether to store or process the selected hydrocarbon based gas based upon whether sufficient quantities of the gas exist to make carbon removal beneficial. If it is determined that the selected hydrocarbon based gas should be stored, the gas is stored at step 928 within a storage container 221 where the gas is kept until sufficient quantities exist to make it economically feasible to remove the carbon therefrom or to inject the gas back into the pipeline as green gas. The process then proceeds to inquiry step 930 to determine if another gas is present within the separated gases, and if so, control passes to step 924 to select another gas. Otherwise, the process of gas selection is completed at step 932.

If inquiry step 926 determines that the selected hydrocarbon based gas should be processed, control passes to step 934 wherein the selected hydrocarbon based gas is combined with steam in order to initiate the carbon monoxide and hydrogen separation process within the SRM 108. The hydrocarbon based gas and steam are heated at step 936. The SRM 108 will separate at step 938 the hydrocarbon based gas into hydrogen, carbon monoxide and gas still containing carbon and hydrogen. The separated carbon monoxide is captured at step 942 and compressed by a compressor at step 944. The captured and compressed carbon monoxide may then be stored at step 946. The separated hydrogen is compressed at step 950 by a hydrogen compressor 238 and stored at step 952 within a storage tank 224.

The gases still containing carbon and hydrogen are stored at 952 and the carbon stored at 946 is received at step 954 by the post quantitative analysis module (QAM) 112. The received carbon, hydrogen and carbon/hydrogen containing gases are identified at step 956 such that they may each be individually processed. The carbon/hydrogen containing gases are processed at step 958 to identify the amount of carbon/hydrogen still contained within the gas. Inquiry step 960 determines whether sufficient carbon exists to reprocess the carbon/hydrogen containing gas. If so, control passes back to the steam reformation module 108, and the gas is preheated at step 936. If sufficient carbon does not exist to reprocess the gas, the gas containing carbon is transmitted back to the natural gas pipeline at step 962.

The separated hydrogen gases are compressed at step 964 to place them in a condition useful for transportation and refueling of hydrogen based vehicles. The compressed hydrogen which remains in gaseous form is stored at step 966. The amount of carbon monoxide contained is determined at step 968 and this carbon monoxide is stored at step 970. The amount of stored removed carbon monoxide has its volume measured at step 972 so the amount of carbon monoxide is known. This amount of carbon is assigned a unique identifier (UID) at step 974. Based upon this unique identifier, a carbon certificate may be created at step 976 and the amount of carbon that has been identified may be used to populate information within the created carbon certificate at step 978.

Figure 10:
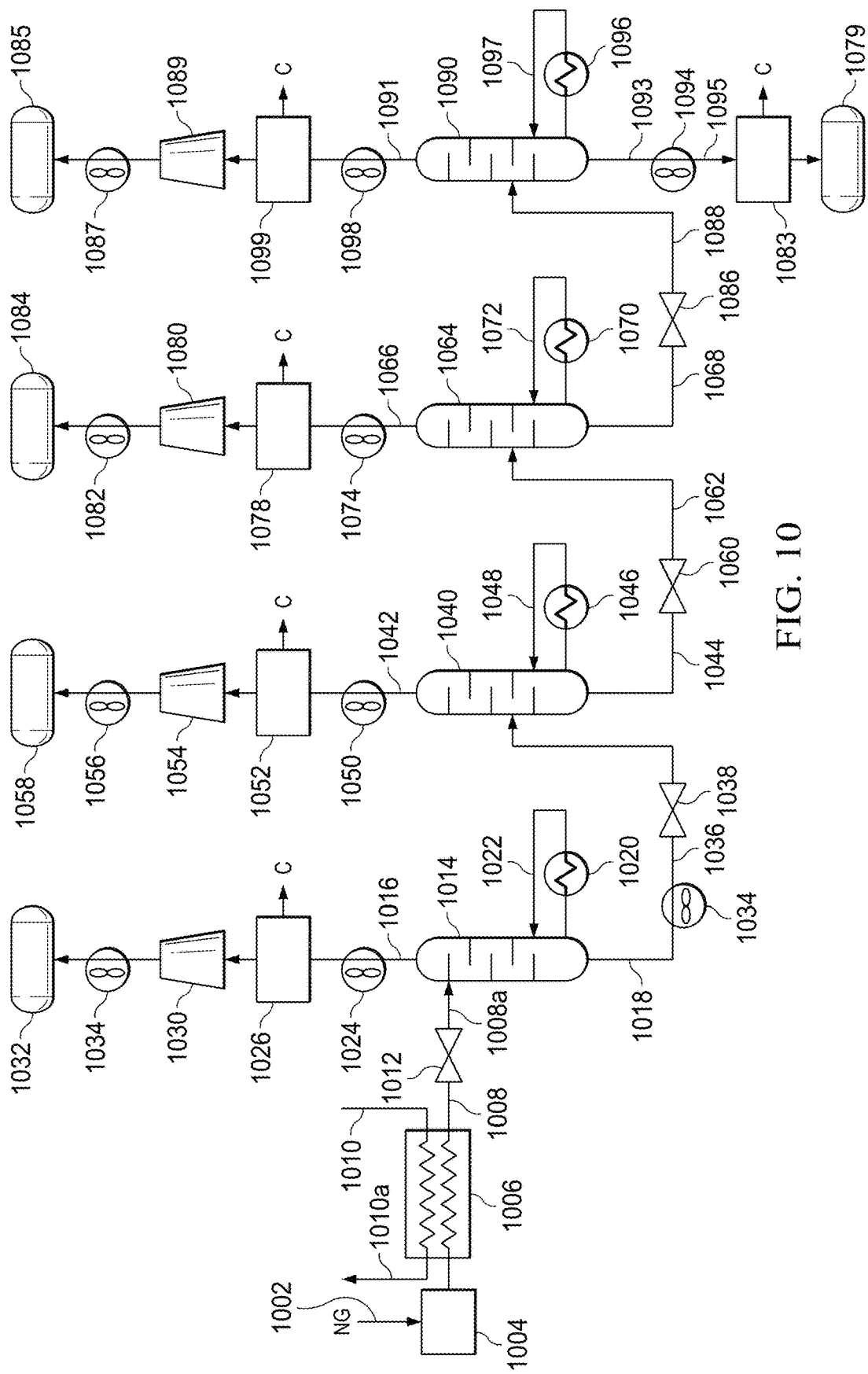
FIG. 10 illustrates a diagram of a separator.

Referring now to FIG. 10, there is illustrated a diagrammatic view of one embodiment of the separator portion of the QAM 106. The process flow is essentially a series of distillation columns that sequenced through to remove the lighter gases at each sequential stage, compressing them and storing them, each individually. A natural gas feed 1002 is input through a valve 1004 to a pre-cooling heat exchanger 1006 to provide a cooled and partly condensed initial hydrocarbon stream 1008. The pre-cooling heat exchanger 1004 may comprise one or more heat exchangers either in parallel, series or both. Cooling in the pre-cooling heat exchanger 1006 is provided by a refrigerant stream 1010, which is warmed in the pre-cooling heat exchanger 1006 to provide a warmed refrigerant stream 1010a.

Cooling of the initial feed stream 1002 may involve reducing the temperature of the initial feed stream to below −0° C., for example in the range of −10° C. to −70° C.

The cooled initial hydrocarbon stream 1008 is a mixed hydrocarbon feed stream that comprises methane and one or more of C2, C3, C4 and C5+ hydrocarbons. Typically, the proportion of methane in the mixed hydrocarbon feed stream 1008 is 30-50 mol %, with a significant fraction of methane and propane, such as 5-10 mol % each. As will be noted hereinbelow, the object is to provide one or more of a methane stream, a C2 stream, a C3 stream, a C4 stream, and possibly some portion of the C5+ stream.

The mixed hydrocarbon feed stream 1008 is passed to the system through a valve 1012 to provide a reduced pressure mixed hydrogen feed stream 1008a, and then enters a first distillation column 1014 at or near the top thereof. The reduced pressure mixed hydrocarbon stream 1008a is typically a mixed phased stream, and the first distillation column 1014 is adapted to separate the gaseous and vapor phases, so as to provide a C1 overhead stream 1016 and the first bottom hydrocarbon stream 1018.

The nature of the hydrocarbon streams provided by the first distillation column 1014 can be varied according to the size and type of distillation column, and its operating conditions and parameters, in a manner known in the art. For the arrangement illustrated in FIG. 10, it is desired for the C1 overhead stream 1016 to be methane-enriched, preferably to be >90 mol % methane. The first distillation column 1014 also includes a first reboiler 1020 and a first reboiler vapor return stream 1022 in a manner known in the art.

Figure 10A:
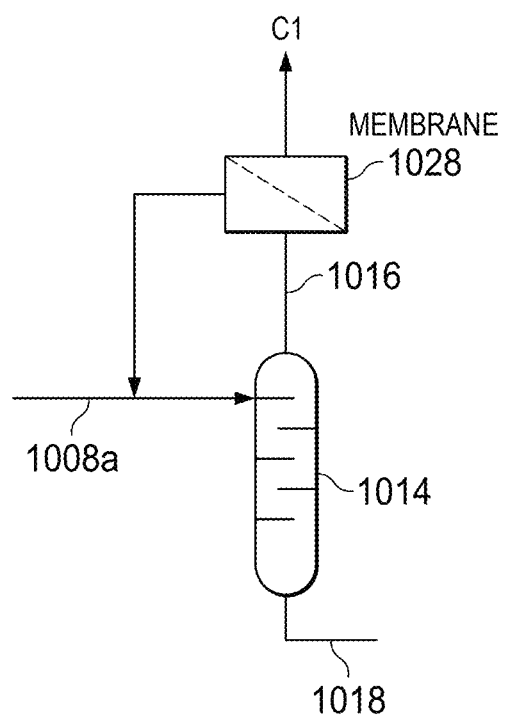
FIG. 10A illustrates a detail of a membrane return path for a distillation column.

The C1 overhead stream 1016 is passed through a cooler 1024 and then the carbon content and molecular weight thereof analyzed by a first analyzer 1026. This analyzer 1026 provides a measurement of the level of carbon and molecular percent of methane, in addition to any other non-methane constituents. Since the distillation column 1014 may not distill only methane gases, i.e., other heavier hydrocarbons may have been distilled, a membrane 1028, illustrated in FIG. 10A, can be employed which will have a pore size that will allow only the C1 hydrocarbons to pass-through and will return the heavier hydrocarbons back to the input line 1008a. This membrane will be facilitated at each distillation column described hereinbelow.

After analysis of the carbon content and molecular percentage, i.e., volume, etc., of the stream output from the cooler 1024, the stream is then input to a compressor 1030 and then to a storage tank 1032 after cooling by a cooler 1034, to provide storage of the C1 hydrocarbons at a minimum pressure of 350 psi or 24.13 bar.

The bottom stream 1018 output from the distillation column 1014 is comprised of nongaseous mixed hydrocarbons that are heavier than the C1 hydrocarbons. These are predominantly C2+ hydrocarbons, such as >90 mol % ethane and heavier hydrocarbons. This first bottom stream 1018 is cooled by one or more ambient coolers 1034, which can comprise a water and/or air cooler, to provide a cooled first bottom stream 1036, which is then passed through a valve 1038 and then into a second distillation column 1040. Again, the type, size and capacity of the second distillation column 1040, as well as its operating conditions and parameters, will control the nature of the streams provided by the second distillation column 1040.

As illustrated in FIG. 10, the second distillation column 1040 provides a C2 overhead stream 1042 being predominately ethane, preferably >85 mol % or >90 mol % ethane, and a second bottom stream 1044, generally being a C3+ stream comprising >98% propane and heavier hydrocarbons. The second distillation column 1040 also includes a second reboiler 1046 and a second reboiler vapor stream 1048. The C2 overhead stream 1042 is passed through a cooler 1050 and then to an analyzer block 1052 in order to determine the amount of carbon and the molecular percentage of the C2 and Carbon in the hydrocarbon stream and then it is compressed by a compressor 1054, by a cooler 1056 and stored in a C2 tank 1058 at a minimum pressure of 350 psi or 24.13 bar.

The second bottom stream 1044 is predominately a C3+ hydrocarbon stream, such as >90 or >95 mol % of propane and heavier hydrocarbons. The second bottom stream 1044 passes through a valve 1060 to provide a reduced pressure second bottom stream 1062, which passes into a third distillation column 1064. The type, size and capacity of the third distillation column 1064, as well as its operating conditions and parameters, will control the nature of the streams provided by the third distillation column 1064.

The third distillation column 1064 provides a C3 overhead stream 1066 being predominately propane, preferably being >85 mol % or >90 mol % propane, and a third bottom stream 1068, generally being a C4+ stream comprising >90 mol % butanes and heavier hydrocarbons. The third distillation column 1064 includes a third reboiler 1070 and a third reboiler vapor stream 1072.

The C3 overhead stream 1066 passes through the cooler 1074 (noting that a membrane similar to the membrane 1028 in FIG. 10A can be utilized to remove heavier hydrocarbons and return them to the input stream 1062) and then to an analyzer block 1078 to determine the molecular weight and carbon content of the C3 stream and then passes the stream through a compressor 1080 and then to a cooler 1082 for storage in a tank 1084 at a minimum pressure of 350 psi or 24.13 bar.

The third bottom stream 1068 passes through a valve 1086 to provide a reduced pressure third bottom stream 1088, which passes into a fourth distillation column 1090. The type, size and capacity of the fourth distillation column 1090, as well as its operating conditions and parameters, will control the nature of the streams provided by the fourth distillation column 1090. The fourth distillation column 1090 provides a C4 overhead stream 1091 being predominately butane and/or i-butane, preferably >85 or >90 mol % butane(s), and a C5+ bottom stream 1093. The C5+ bottom stream 1093 may pass through one or more ambient coolers 1094 such as a water and/or air cooler to provide a C5+ product stream 1095. The fourth distillation column 1090 includes a fourth reboiler 1096 and a fourth vapor return stream 1097.

The C4 overhead stream 1091 is passed-through a cooler 1098 and then to an analyzer block 1099 (after being purified with a membrane, as described hereinabove) in order to calculate the molecular weight and carbon content of the C4 stream passing therethrough and then to a compressor 1089 a cooler 1087 and then to a C4 tank 1085 for storage therein at a minimum pressure of 350 psi or 24.13 bar.

With the four distillation columns 1014, 1044, 1064 and 1090, four hydrocarbon streams have been separated and divided out, the C1, C2, C3 and C4 hydrocarbon streams. Additional distillation columns could be utilized to recover whatever hydrocarbons exist in the C5+ hydrocarbon stream 1095. However, if only these four hydrocarbon streams are desired, then the C5+ stream 1095 is considered the "trash" stream with all of the undesired products. This stream 109 for the C5+ will be passed through an analyzer block 1083 in order to calculate the amount of carbon contained therein. If there were, for example, carbon products such as $CO_2$ and C5+ hydrocarbons, the carbon content of this particular stream 1095 could be determined. This will be then stored in a tank 1079 for later disposal and carbon sequestration. As we noted hereinbelow, by knowing the amount of carbon that is in the "trash" portion of the initial input stream 1002, it can be determined how the constituents (and the associated carbon content) considered to be in the trash, which was removed from the initial stream 1002. A system similar to that described hereinabove with respect to FIG. 10 is described in US publication Number 2011/0023536, which is incorporated herein in its entirety.

Figure 11:
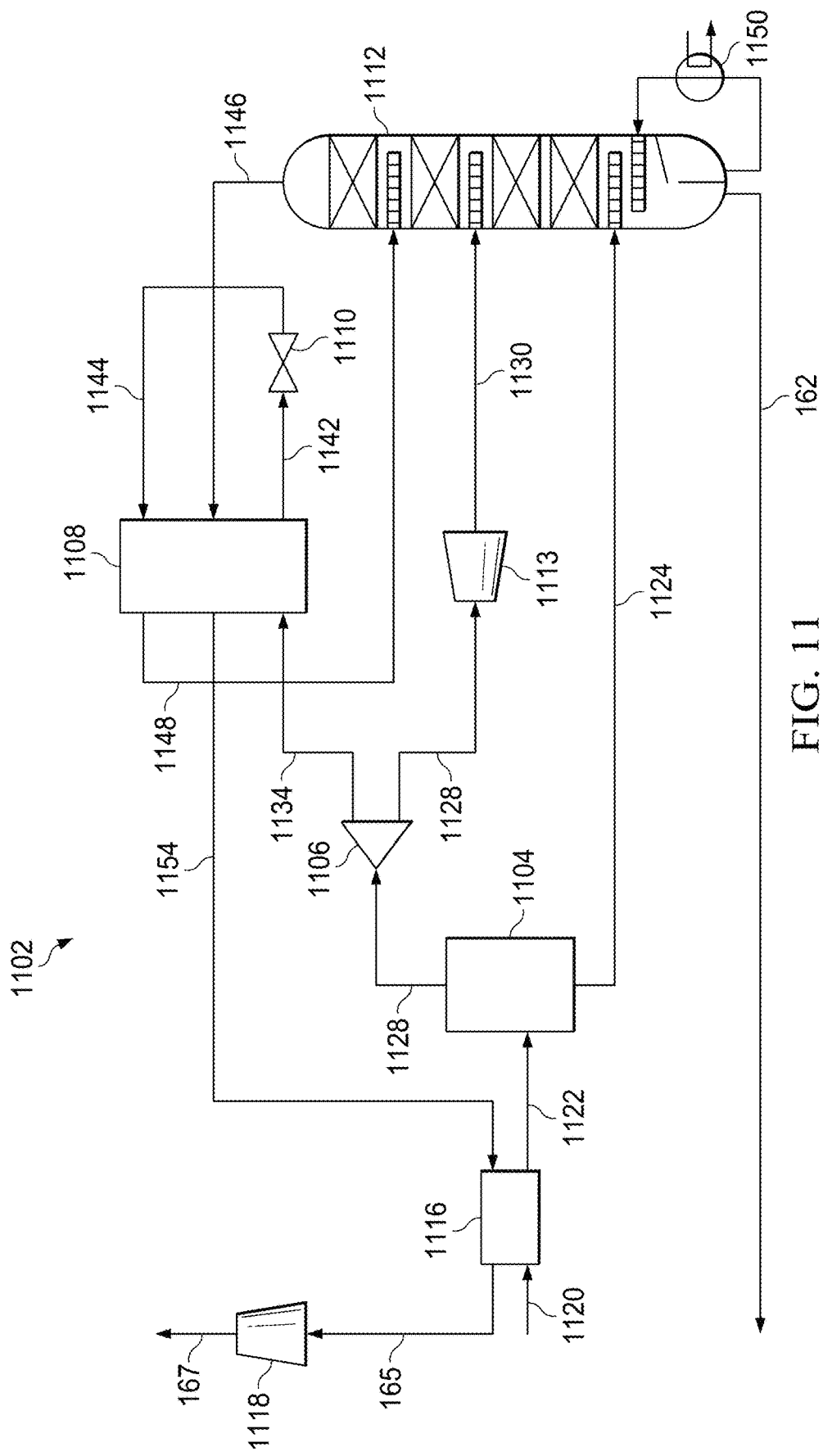
FIG. 11 illustrates a detail of the demethanizer.

Referring now to FIG. 11, there is illustrated an example of a natural gas fractional distillation apparatus 1102 which includes a gas liquid separator 1104 into which it condenses natural gas flows and which separates the condensed natural gas into a vapor stream and the liquid stream, a gas separator 1106 which separates the vapor stream separated in the gas-liquid separator 1104 into a first vapor stream and a second vapor stream, a first heat exchanger 1108 which condenses the first of vapor stream separated in the gas separator 1104, a first expander 1110 which expands the first vapor stream condensed in the first heat exchanger 1108, a second expander 1113 which expands a second vapor stream separated in the gas separator 1104, a distillation tower 1112 into which the liquid stream separated in the gas-liquid separator 1104, the first vapor stream expanded in the first expander 1110, and the second vapor stream expanded in the second expander 1113 flow in order to be divided into an overhead vapor stream containing the methane (or other C+ hydrocarbon been distilled) and a complement-reinforced lower stream that is heavier than methane (or other C+ hydrocarbon been distilled), a second heat exchanger 1116 which discharges a condensed natural gas by exchanging heat between the natural gas and the overhead vapor stream discharged after the heat exchange in the first heat exchanger 1108, and a compressor 1118 which compresses the overhead vapor stream discharged after the heat exchange in the second heat exchanger 1116.

The first vapor stream decompressed and cooled in the first expander 1110 is used as a coolant of the first heat exchanger 1108 and thus energy applied to the distillation tower 1112 and energy used in the compressor 1118 which condenses and cools the overhead vapor stream discharged from the distillation tower 1112 may be reduced.

After having passed through a pre-treatment process, the natural gas flows into the second heat exchanger 1160 along an input feed 1120. The second heat exchanger 1116 changes the state of natural gas into a condensed natural gas by condensing the natural gas in a gaseous state after having passed through the pre-treatment process. The output of the second heat exchanger 1116 is discharged along a second flow path 1122 to the gas-liquid separator 1104. The gas-liquid separator 1104 separates the condensed natural gas into a vapor stream in a gaseous state and a liquid stream in a liquefied state. The liquid stream flows into a lower position of the distillation tower 1112 along a third flow path 1124.

The vapor stream in the gaseous state separated from the gas-liquid separator 1104 flows into the gas separator 1106 along a fourth flow path 1128. The gas separator 1106 separates the vapor stream into a first vapor stream and a second vapor stream according to a preset ratio. The first vapor stream and the second vapor stream may be separated in a ratio of 2:8 to 1:9. The second vapor stream separated in the gas separator 1106 flows into the second expander 1113 along a fifth flow path 1128. As the temperature of the second vapor stream in the second expander 1113 is lowered, the second vapor stream may be changed from a gaseous state to a liquefied state or may exist in both gaseous and liquefied states.

The second vapor stream that has passed through the second expander 1113 flows into the distillation tower 1112 along a sixth flow path 1130 to the distillation tower 160 at an upper position compared to the position of the third flow path 1124 such that the second vapor stream that has passed through the sixth flow path 1130 flows into the distillation tower 1112 at an upper position compared to the position of the liquid stream that has passed through the third flow path 1124.

The first vapor stream flows into the first heat exchanger 1108 along a seventh flow path 1134, and then, the first vapor stream discharged from the first heat exchanger 1108 flows into the first expander 1110 along an eighth flow path 1142. The first vapor stream rapidly expands and is decompressed in the first expander 1110 and the temperature of the first vapor stream is rapidly lowered. Accordingly, the first vapor stream may be changed from a gaseous state to a liquefied state or may exist in both gaseous and liquefied states. The first vapor stream that has passed through the first expander 1110 maintains the lowest temperature.

On the other hand, the first vapor stream discharged from the first expander 1110 flows again into the first heat exchanger 1108 along a ninth flow pass 1144. The overhead vapor stream discharged from the top portion of the distillation tower 1112 along an eleventh flow pass 1146 flows into the first heat exchanger 1108. As such, the first heat exchanger 1108 exchanges heat among the first vapor stream flowing in along the seventh flow pass 1134, the first vapor stream flowing in again along the ninth flow pass 1144, and the overhead vapor stream flowing in along the eleventh flow pass 1146.

The first vapor steam that has passed through the first heat exchanger 1108 flows into the distillation tower 1112 along a tenth flow path 1148 at an upper position of the distillation tower 1112 compared to the position of the second vapor stream that has passed through the sixth flow path 1130. In other words, the tenth flow pass loan forty-eight is connected to the distillation tower 1112 at an upper position compared to the position of the sixth flow path 1130.

As such, the liquid stream, the first vapor stream, and the second vapor stream that flow into the distillation tower 1112 are heated and vaporized by a reboiler 1150 provided adjacent to the distillation tower 1112 along a circulation flow pass provided in a lower portion of the distillation tower 1112, and then flow again into the distillation tower 1112.

The distillation tower 1112 separates a raw natural gas into a methane (or higher C+ hydrocarbon)-reinforced overhead vapor stream and the component-reinforced lower stream that is heavier than methane. The overhead vapor stream is discharged from the top of the distillation tower 1112 and cooled by passing through the first heat exchanger 1108 along the eleventh flow pass 1146, and is discharged from the first heat exchanger 1108 along a twelfth flow path 1154 to flow into the second heat exchanger 1116.

Figure 12:
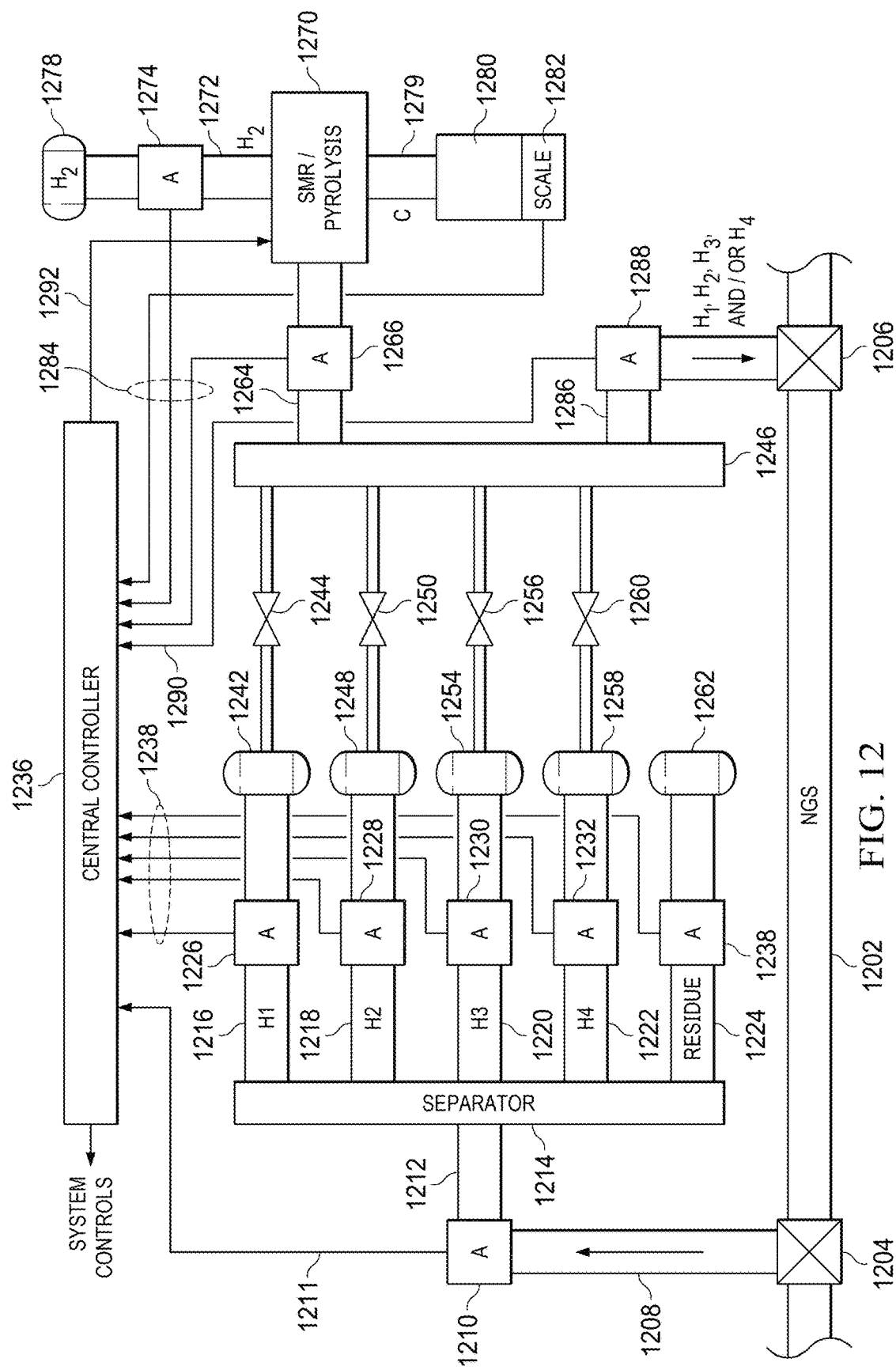
FIG. 12 illustrates a diagrammatic view of the overall carbon monitoring and control operation.

Referring now to FIG. 12, there is illustrated a diagrammatic view of the overall carbon monitoring and control operation. The natural gas line 1202 is tapped into with a first inlet valve 1204 and an output valve 1206 is provided for a return of what is referred to as "green gas" that comprises the natural gas with certain undesirable constituents removed. When the system is enabled, the valve 1204 is opened and gas is rerouted to the system and returned via valve 1206. This can be a complete bypass or a partial bypass.

When open, the output of the valve 1204 provides a feed 1208 which, from a compositional standpoint, contains all of the constituents included within the natural gas flowing through the natural gas line 1202. As noted hereinabove, each location long any natural gas pipeline will be comprised of gas derived from multiple and different providers. It may be known who the providers are at that point, but the actual makeup is really a function of what the standard is for those providers as to how well the natural gas is cleaned up before inputting it to the natural gas line. The actual composition of this feed 1208 is measured with an analyzer 1210, as described hereinabove, in order to provide a very detailed record of the makeup of the natural gas at this point in the natural gas line 1202. This particular analyzer 1210 is operable to determine the compositional makeup of the gas flowing to the feed 1208 and molecular percentages thereof including the molecular weight of each constituent and provide this information to a central controller 1236 via a data line 1211. As such, the actual carbon content of this particular feed 1208 can be determined as an absolute number. The analyzed output is then provided to a feed 1212 to a separator 1214. The separator 1214, as described above with respect to FIG. 10, comprises the distillation chain which sequentially distills all of the hydrocarbon layers.

From a diagrammatic standpoint, there are illustrated five output feeds from the separator 1214. These are feeds 1216 1218 1220, 1222 and 1224. These are labeled as feeds or flows $H_1$, $H_2$, $H_3$, $H_4$ and Residue. These will basically correspond to the C1, C2, C3 and C4 flows above the respect to FIG. 10 and the residue will be the C5+ flow of the heavier hydrocarbons that remain along with any other constituents, such as carbon bearing materials such as $CO_2$ and CO, non-Hydrogen compounds such as $H_2S$ 1228, 1230, 1232 and the residue feed defines the trash or residue portion of the diverted natural gas that has not been separated and designated for later processing or storage.

Each of the feeds 1216-1224 has associated therewith an associated analyzer 1226, 1228, 1230, 1232 and 1234, respectively. Each of these feeds 1216-1224 is individually analyzed with respect to the molecular weight and the amount of carbon contained therein by the respective analyzers 1226-1234. Each of these analyzers 1226-1234 provide their associated output through control lines 1238 to the central controller 1236 for analysis thereof.

The analyzed feed output of the analyzer 1226 is input to a storage tank 1242 which is connected through a valve 1244 to the manifold 1246. The manifold 1246 is a multiplexing manifold that is operable to provide an output for either hydrogen conversion or to provide an output for return to the valve 1206. In a similar manner, the analyzed feed output of the analyzer 1228 is input to a tank 1248 which is connected to a valve 1250 to the manifold 1246. The analyzed feed output of the analyzer 1230 is input to a storage tank 1254 which can be connected to the manifold 1246 through a valve 1256. The analyzed output of the analyzer 1232 is input to a tank 1258 which can be connected to the manifold 1246 through a valve 1260. The analyzed output of analyzer 1234 that is associated with the residue feed line 1224 is input to a tank 1262 for storage thereof and later sequestration or disposal thereof.

When selected by the manifold 1246 for the hydrogen generation process, any one of the tanks 1242, 1248, 1254 or 1258 can be selected for processing to break the Hydrogen-Carbon bond in the selected hydrocarbon to derive $H_2$ and elemental Carbon therefrom. The selection will provide an output along a selected feed 1264 for input to an analyzer 1266 to again analyze the particular molecular weight and carbon content of the selected feed to be used for the hydrogen generation process. This is then input to a processing block 1270 in order to separate the Hydrogen from the Carbon in the hydrocarbon to provide $H_2$ and elemental Carbon. This utilizes either SMR or pyrolysis, as will be described hereinbelow. This provides on a feed 1272 the Hydrogen $H_2$ which is then input to an analyzer 1274 in order to analyze the amount of Hydrogen that has been extracted and the purity thereof. This is then stored in a tank 1278 at a minimum pressure of 350 psi or 24.13 bar. The Carbon is provided along a feed 1279 for storage in a Carbon holding container 1280, the contents of which can be weighed with a scale 1282. For the hydrogen generation operation wherein a selected and stored hydrocarbon is directed by the manifold 1256 for processing thereof, the control lines from the analyzer 1266, the analyzer 1274 and the scale 1282 are passed through a control line bundle 1284 back to the central controller 1236.

When the manifold 1246 is operated to provide "green gas" back to the natural gas line 1202, one or more of the tanks 1242, 1248, 1254 or 1258 are selected by the respective valves for passing through to the valve 1206. Any one or all of the outlets of the tanks 1242, 1248, 1254 and 1258 can be selected. When selected, they are passed through a feed 1286 to analyzer 1288 to be analyze for Carbon content and molecular composition. By making this measurement that constitutes the "actual" makeup of the gas being returned to the natural gas line, a deterministic composition is known. This is compared to just making an assumption that a certain volume of gas is extracted from each of the tanks 1242, 1248, 1254 or 1258 and which is considered to be at a certain level in comparing this to an estimated composition of the input feed. Thus, the analyzer 1288 define exactly what is being returned as the green gas. The analyzer 1288 has a control line 1290 that is input to the central controller 1236.

The controller 1236 is basically operable to analyze all of the feeds as gas is passed through the system via the respective analyzers at a numerous points along the gas flow and also control the operation of the processing block 1270 through a control line 1292 and also control all of the valves and the operation of the system. This allows the central controller 1236 to make a determination as to what hydrocarbons need to be processed based upon having knowledge makeup of the feeds at all points in the process, this determination being made from an economic standpoint based upon various input parameters in order to optimize the overall system. However, in order to provide such a function, it is necessary to have knowledge of exactly where the various hydrocarbons being processed originate from, how much residue or trash has been removed from the natural gas line before returning the green gas back to the natural gas line 1202 and how much of the hydrocarbon gas has been processed to generate hydrogen $H_2$ and extract elemental Carbon therefrom. By knowing the actual makeup of the gas at all points on the process, the amount of Carbon that is actually contained within the initial feed, the amount that is removed before returning the green gas and/or the amount of Carbon actually removed from any one of the stored hydrocarbons as elemental Carbon is known exactly. This is compared to assuming the makeup of the natural gas and measuring the amount of Carbon removed, such as the amount of $CO_2$ that was generated as a byproduct. By knowing how much Carbon is actually contained in the initial feed, how much Carbon was actually returned to the natural gas line 1202 as green gas and the amount of Carbon that was extracted in the $H_2$ generation process, an exact number as to Carbon removed from the environment can be determined.

Figure 13A:
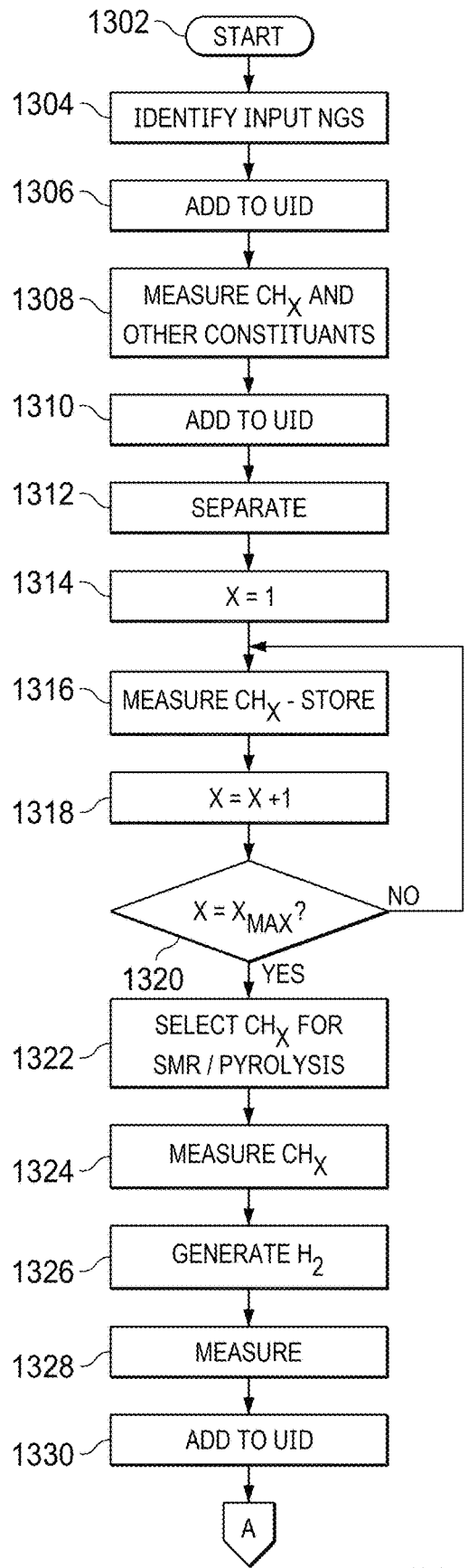
FIGS. 13A and 13B illustrate a flowchart for the operation of the embodiment of FIG. 12.
Figure 13B:
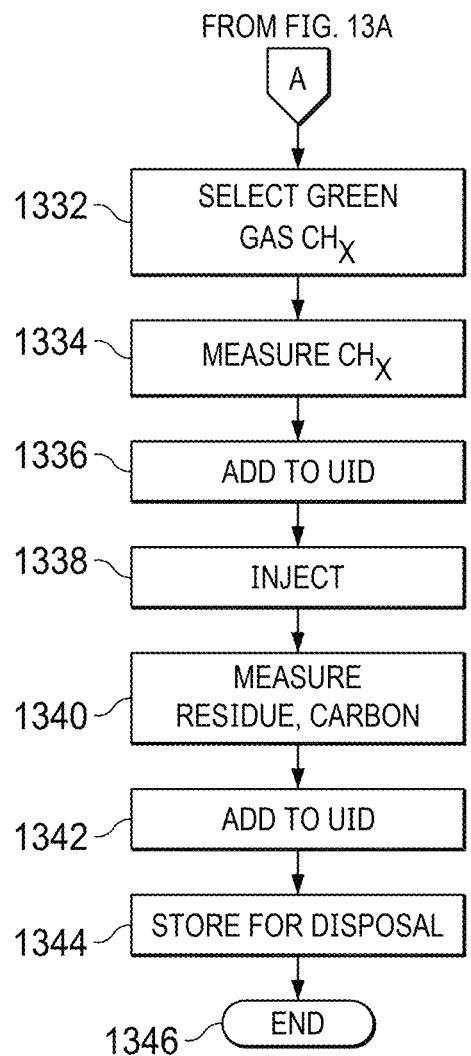

Referring now to FIGS. 13A and 13B, there is illustrated a flowchart for the operation of the embodiment of FIG. 12. The flow is initiated at a Start block 1302 and proceeds to a block 1304 to identify the input natural gas system from which natural gas is being "tapped." This identity defines the location of the feed along a particular gas line, the actual gas line and even the source of the natural gas. As described hereinabove, natural gas in a pipeline is typically sourced by different providers that each provider has slated different guidelines to how they clean their gas before inputting it to the pipeline. It is a requirement to remove the majority of certain elements prior to putting gas into the pipeline, as the pipeline can be damaged by certain gases, such as hydrogen sulfide $H_2S$. However, a number of providers have thresholds, and, for example, one provider may have a very low native level of hydrogen sulfide and another much higher. The second provider will just ensure the hydrogen sulfide is below a certain level before inserted there processed natural gas into the pipeline. Thus, the actual level of hydrogen sulfide in the natural gas is really unknown as to its absolute value. Thus, the providers of the natural gas know what is in the pipeline and what is extracted therefrom is important to information. This information is noted and added to a Unique Identification Certificate (UIC).

This UIC, as will be described hereinbelow, is created and uniquely defines the natural gas that is being processed and either returned to the pipeline as green gas or converted to Hydrogen ($H_2$) and Carbon. When the natural gas is extracted from the pipeline, samples of the composite natural gas are taken, analyzed and averaged out over a finite volume. Typically, CCF, MCF and Therms are all ways of measuring units of natural gas. The CF in this measurement stands for cubic feet. The "C" in CCF stands for the Roman number for 100. So "CCF" means 100 cubic feet of natural gas. The "M" in MCF stands for Roman numeral for 1,000. So "MCF" means 1,000 cubic feet of natural gas. Each UIC is associated with a finite and discrete amount of natural gas. For example, a UIC might be defined over a unit of 1000 cubic feet of natural gas. Each MCF of natural gas that is processed would, in one example, have a UIC associated there with. This relates to the processing capacity of a particular system.

The next step is defined at a block 1308 wherein the constituents of the natural gas in the main feed, i.e., the feed directly from the pipeline, are determined and the molecular percentages and weights determined. In this manner, all of the hydrocarbons in the main feed can be determined as to the percentage thereof, the molecular weight of each hydrocarbon, all other constituents such as $CO_2$, CO, $H_2S$, etc. that make up the hydrogen. Thus, the substantially exact amount by weight of all of the elements can be determined. This is important, in one aspect, with respect to the amount of Carbon that is contained within the main natural gas feed from the pipeline. The flow then proceeds to a block 1310 wherein all of this information is added to the UIC. The flow then proceeds to a block 1312 wherein the various hydrocarbon streams are separated from the "trash" portion of the feed. As described hereinabove, the trash portion of the feed comprises anything other than desired hydrocarbons. The flow then proceeds to a block 1314 to initiate the separation operation, which is a sequential distillation operation. The flow then proceeds to a block 1316 to measure the molecular percentage of the CHx in the desired feed and then store this in the storage tank. The flow then proceeds to a block 1318 to increment the distillation process to the next CHx hydrocarbon and then to a decision block 1320 in order to determine if the overall distillation process is complete. If not, the flow proceeds back to the input of block thirteen sixteen.

When all of the desired hydrocarbon feeds have been separated (distilled) measured and stored in the respective tanks, the flow proceeds to a block 1322 in order to, for the purpose of generating hydrogen $H_2$, initiate the hydrogen generation process. This is either an SMR process or a pyrolysis (described hereinbelow) process. The particular storage tank within which the desired hydrocarbon CHx is extracted from is processed so as to measure the molecular content and makeup of the gas to ensure the purity thereof and the molecular weight thereof—this performed at block 1324. Thus, at this point, the actual amount of carbon in the gas is determined. The process then flows to a block 1326 wherein the hydrogen $H_2$ is generated and then to a block 1328 to measure the volume and molecular content, i.e., purity, of the hydrogen generated. This information is added to the UIC, at a block 1330.

The flow proceeds to a block 1332 in order to output green gas to the pipeline. This green gas, as described hereinabove, is comprised of one or more of the desired hydrocarbons that was stored and not utilized for generation of hydrogen. There are different reasons to extract any hydrocarbon from the storage tanks for processing as hydrogen. As described hereinabove, there are certain situations wherein the plant has reached its maximum production for hydrogen in a given time period, such as a day. In this case, all of the hydrocarbons would be routed from the tanks to the output associated with the green gas. Once the hydrocarbons are selected for combining into the green gas feed, this feed is measured to determine the molecular content and makeup thereof at a block 1334 and this information is then added to the UIC at a block 1336. This green gases that injected into the pipeline at a block 1338. Thereafter, residue portion, i.e., the trash gas, is a measure to determine the makeup thereof, specifically the amount of carbon. This is indicated at a block 1340. This information is added to the UIC at a block 1342. This trash gas is stored for disposal. The flow then proceeds to an End block 1346.

Figure 14:
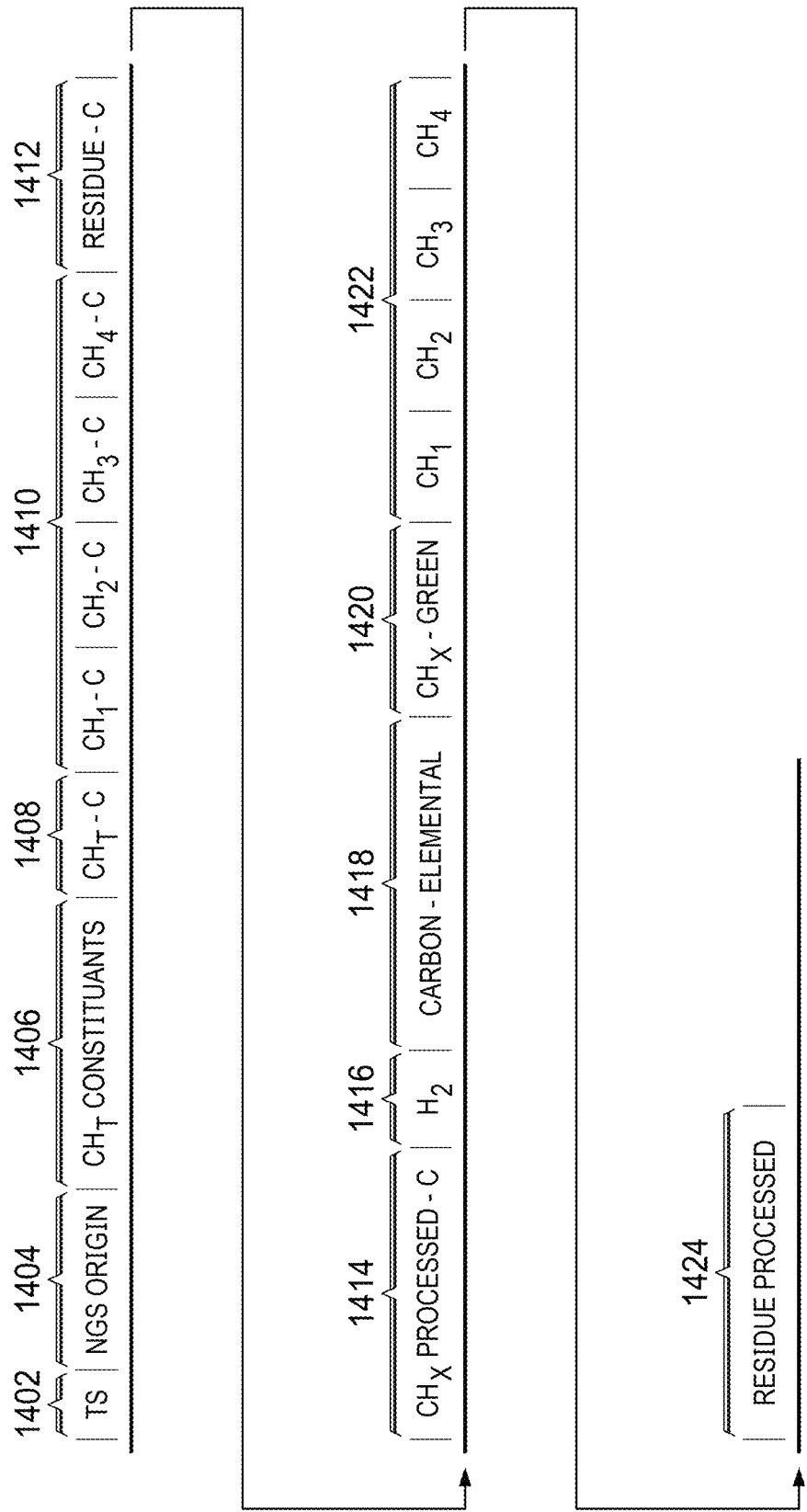
FIG. 14 illustrates a diagram of the UIC.
Figure 15:
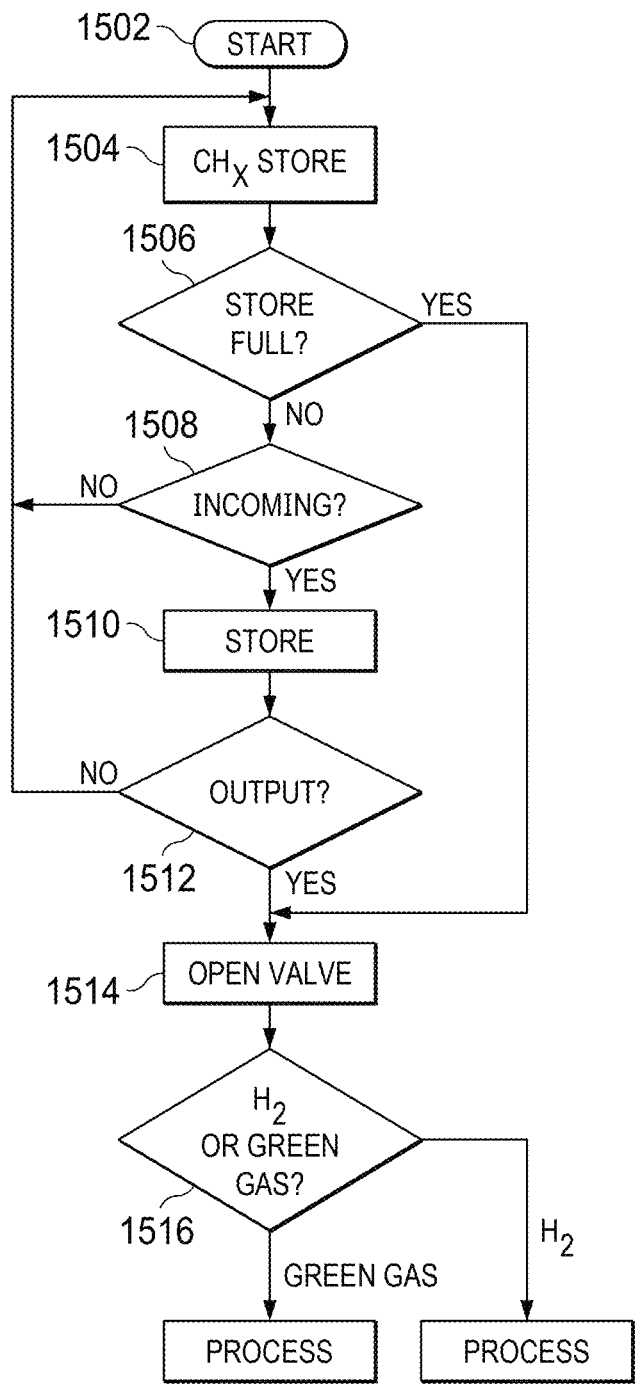
FIG. 15 illustrates a flow chart for the operation of returning green gas to the natural gas main feed line.

Referring now to FIG. 14, there is illustrated a diagrammatic view of the UIC. The UIC, as described hereinabove, is a data value that uniquely sets forth information about a finite volume of natural gas. This value may represent total volume based upon one or more samples taken in time. For example, the flow rate of the natural gas is known, and a sample can be taken at an initial time and then averaged for this finite volume with additional samples, or it could be just a single sample per finite volume. A UIC will be generated for and uniquely associated with this finite volume in time based upon the flow rate. Again, this could be a single sample taken for the finite volume or multiple samples taken during the time that this finite volume in the diverted feed during extraction from the natural gas pipeline.

Initially, a time stamp 1402 is generated representing when the sample is taken, indicating the beginning of extraction of a particular finite volume. If known, the origin of the particular natural gas in the natural gas pipeline can be provided in a field 1404. At the sample time, all of the constituents that are contained within the sampled natural gas for that sample are determined with the gas chromatograph and stored in a field 1406. In a field 1408, the Carbon value representing the total Carbon that is contained within the initial sample is extrapolated across the entire finite volume and stored. In a plurality of subsequent fields 1410, the Carbon value for each of the desired hydrocarbons is stored, in addition to the carbon value for the residue of field 1412. In these fields 1410 and 1412, information in each of the fields represents the total molecular weight extrapolated over the entire finite volume, the entire Carbon value of any particular constituent is determined. For the residue field 1412, the total molecular weight of each constituent is stored, including the total Carbon value.

In a field 1414, the amount of the selected hydrocarbon that is processed to generate Hydrogen, $H_2$, and elemental Carbon reflects the amount of the selected hydrocarbon, CHx, that is input to the hydrogen generation process, either the SMR process or the pyrolysis process, for processing and generation of hydrogen gas, $H_2$, and Elemental Carbon. A field 1416 represents the actual hydrogen gas, $H_2$, that was produced reflecting the molecular weight per finite volume and the purity thereof. A field 1418 represents the amount of Elemental Carbon that was produced from the input selected hydrocarbon per finite volume and the purity thereof. As noted hereinabove, during the processing to separate Hydrogen and Carbon from these selected hydrocarbon, CHx, 100% of the selected hydrocarbon may not have been completely processed due to the efficiency of the process, such that the result of the process, the SMR or pyrolysis process, which may result in hydrogen in the gas $H_2$, Elemental Carbon and some residue of the selected hydrocarbon, CHx. As also noted hereinabove, the remainder hydrocarbon, CHx, from the hydrogen generation process is either circulated back for reprocessing in the hydrogen generation process or inserted into the green gas fed back to the natural gas pipeline. A field 1420 represents the measured makeup of the green gas. As noted hereinabove, the Residue is not included in this particular mix, as this Residue was removed in the distillation process and not stored in any of the tanks from which the green gas is selected. This value represents the desired hydrocarbons that were separated out with the amount of the selected hydrocarbon diverted to the hydrogen generation process being known. Thus, it is known exactly how much Carbon was present in the initial diverted feed to the system and how much Carbon is returned to the feed. Each of these green gas hydrocarbons are represented in a plurality of fields 1422 as to the molecular weight and percentage and the Carbon content. The Residue processed, which is not contained in the green gas feed, is represented in a field 1424. This field 1424 represents the measured residue that is remaining after the distillation process.

Referring now to FIG. 14, there is illustrated a diagrammatic view of the UIC. The UIC, as described hereinabove, is a data value that uniquely sets forth information about a finite volume of natural gas. This value may represent total volume based upon one or more samples taken in time. For example, the flow rate of the natural gas is known, and a sample can be taken at an initial time and then averaged for this finite volume with additional samples, or it could be just a single sample per finite volume. A UIC will be generated for and uniquely associated with this finite volume in time based upon the flow rate. Again, this could be a single sample taken for the finite volume or multiple samples taken during the time that this finite volume in the diverted feed during extraction from the natural gas pipeline.

Initially, a time stamp 1402 is generated representing when the sample is taken, indicating the beginning of extraction of a particular finite volume. If known, the origin of the particular natural gas in the natural gas pipeline can be provided in a field 1404. At the sample time, all of the constituents that are contained within the sampled natural gas for that sample are determined with the gas chromatograph and stored in a field 1406. In a field 1408, the Carbon value representing the total Carbon that is contained within the initial sample is extrapolated across the entire finite volume and stored. In a plurality of subsequent fields 1410, the Carbon value for each of the desired hydrocarbons is stored, in addition to the carbon value for the residue of field 1412. In these fields 1410 and 1412, information in each of the fields represents the total molecular weight extrapolated over the entire finite volume, the entire Carbon value of any particular constituent is determined. For the residue field 1412, the total molecular weight of each constituent is stored, including the total Carbon value.

In a field 1414, the amount of the selected hydrocarbon that is processed to generate Hydrogen, $H_2$, and elemental Carbon reflects the amount of the selected hydrocarbon, CHx, that is input to the hydrogen generation process, either the SMR process or the pyrolysis process, for processing and generation of hydrogen gas, $H_2$, and Elemental Carbon. A field 1416 represents the actual hydrogen gas, $H_2$, that was produced reflecting the molecular weight per finite volume and the purity thereof. A field 1418 represents the amount of Elemental Carbon that was produced from the input selected hydrocarbon per finite volume and the purity thereof. As noted hereinabove, during the processing to separate Hydrogen and Carbon from these selected hydrocarbon, CHx, 100% of the selected hydrocarbon may not have been completely processed due to the efficiency of the process, such that the result of the process, the SMR or pyrolysis process, which may result in hydrogen in the gas $H_2$, Elemental Carbon and some residue of the selected hydrocarbon, CHx. As also noted hereinabove, the remaining hydrocarbon, CHx, from the hydrogen generation process is either circulated back for reprocessing in the hydrogen generation process or inserted into the green gas fed back to the natural gas pipeline. A field 1420 represents the measured makeup of the green gas. As noted hereinabove, the Residue is not included in this particular mix, as this Residue was removed in the distillation process and not stored in any of the tanks from which the green gas is selected. This value represents the desired hydrocarbons that were separated out with the amount of the selected hydrocarbon diverted to the hydrogen generation process being known. Thus, it is known exactly how much Carbon was present in the initial diverted feed to the system and how much Carbon is returned to the feed. Each of these green gas hydrocarbons are represented in a plurality of fields 1422 as to the molecular weight and percentage and the Carbon content. The Residue processed, which is not contained in the green gas feed, is represented in a field 1424. This field 1424 represents the measured residue that is remaining after the distillation process.

Figure 16:
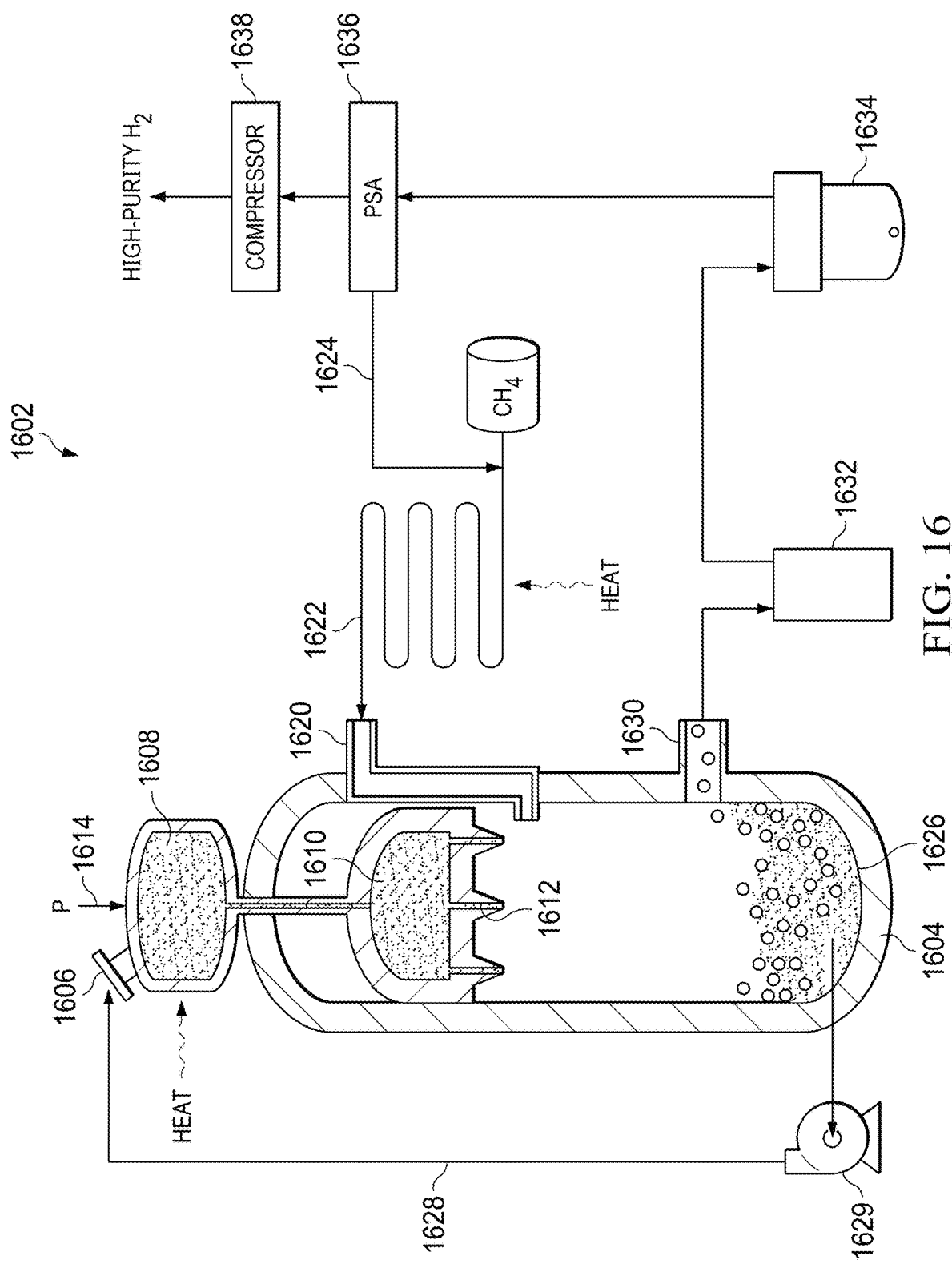
FIG. 16 illustrates a view of a reactor for a hydrocarbon pyrolysis process.

Referring now to FIG. 16, there is illustrated a diagrammatic view of a reactor for a hydrogen pyrolysis process. For the pyrolysis process, a system 1602 is provided which is operable to facilitate the thermal decomposition of a hydrocarbon such as methane. For purposes of this illustration, the decomposition of methane will be described. In some pyrolysis processes, sometimes referred to as a methane cracking process or dry cracking process, a catalyst is utilized. In one example, nickel can be used as a catalyst which lower the overall temperature of the process. Without a catalyst, the temperature can much higher, as the reaction starts at temperatures above 700° C. In order to achieve technically relevant reaction rates hydrocarbon conversion rates, the temperature must be considerably higher, i.e., for catalytic processes above 800° C., for thermal processes above 1000° C., and one using plasma torches up to 2000° C. The main reaction of methane pyrolysis is endothermic and ideally produces solid carbon and gaseous hydrogen according to the following reaction equation:

$$CH_4 \square C + 2H_2 \Delta RH° = 74.91 \text{ kJ mol}-1$$

As noted, the steam reformation process (SMR) produces $CO_2$, whereas the pyrolysis process generates elemental Carbon. The SMR process is endothermic and requires temperatures of 750° C. to 900° C. and pressures above 30 bar on a Ni-Based catalyst. The advantages of utilizing methane pyrolysis as a process for recovering Hydrogen, $H_2$, from natural gas is that it requires no oxidize or for Carbon capture and sequestration (CCS) because it the primary output is elemental Carbon and not $CO_2$, as is the case with SMR. Pyrolytic decomposition can be affected in three ways: thermal, plasma and catalytic. The $H_2$ gas produced is referred to as "turquoise" Hydrogen. This means that it has a collar between blue and green. The thermal pyrolysis approach is highly endothermic which starts to produce Carbon and $H_2$ around 300° C. and then finishes around 1300° C. In the catalytic pyrolysis approach, metals like Ni, iron, copper and cobalt can be utilized to facilitate the decomposition and lower temperatures, typically around 500° C.-800° C. In the plasma pyrolysis approach, a plasma driven thermal decomposition in the gas phase yields $H_2$ and solid Carbon. This approach utilizes plasma torches to crack the hydrocarbon molecule into $H_2$ and Carbon Powder.

Referring further to FIG. 16, liquid mist catalyst reactor vessel 1604 has an inlet 1606 to which a liquid catalyst loads into the vessel. A preheating chamber 1608 heats the catalyst to make it easier to turn it into a mist or it is heated in the internal reservoir 1610. For some materials, this may involve melting the material into a liquid catalyst. The liquid catalyst is transferred into the reactor chamber 1604 through a series of nozzles or orifices 1612 that convert the liquid catalyst into a mist. Pressure may be added at 1614 to assist with this process. In one embodiment, the average diameter of the particulate in the mist is between 1 and 1000 microns, and the droplet fill fraction is between 1 and 25 percent.

The hydrocarbon gas is also introduced into the chamber 1604 through the inlet or port 1620. The hydrocarbon gas inlet may be located at any spot on the vessel. In this particular embodiment, the hydrocarbon gas is methane and is heated by heater 1622 prior to entering the chamber and there is a hydrocarbon recirculation channel 1624. The reaction in the chamber 1604 between the liquid catalyst mist and the hydrocarbon gas results in a separation of hydrogen and carbon from the gas. Some of the carbon, which will typically comprise a solid, will fall to the bottom of the chamber 1604, mixed in with the unreacted liquid catalyst. The chamber 1604 may have a liner 1626, such as a ceramic or other type of liner, which is a barrier between the liquid catalyst and material of construction of reaction vessel 1604. The catalyst is subsequently recovered through recirculation line 1628, which also includes the use of an appropriate high-temperature pump 1629 to recirculate the liquid catalyst.

Some of the carbon may also be entrained in the hydrogen gas that exits in the chamber through the outlet 1630. This may be captured using a filter, such as a knockout pot 1632, and a second filter 1634. These allow extraction of the solid carbon from the hydrogen gas. In this particular embodiment, the gas may go through a pressure swing adsorber (PSA) 1636 and a compressor 1638 to output high-purity product gas. In one embodiment, the output hydrogen may be 99.999% pure at 10 bar of pressure. The PSA 1636 outputs the recital hydrocarbon back to the input on the line 1624.

Figure 17:
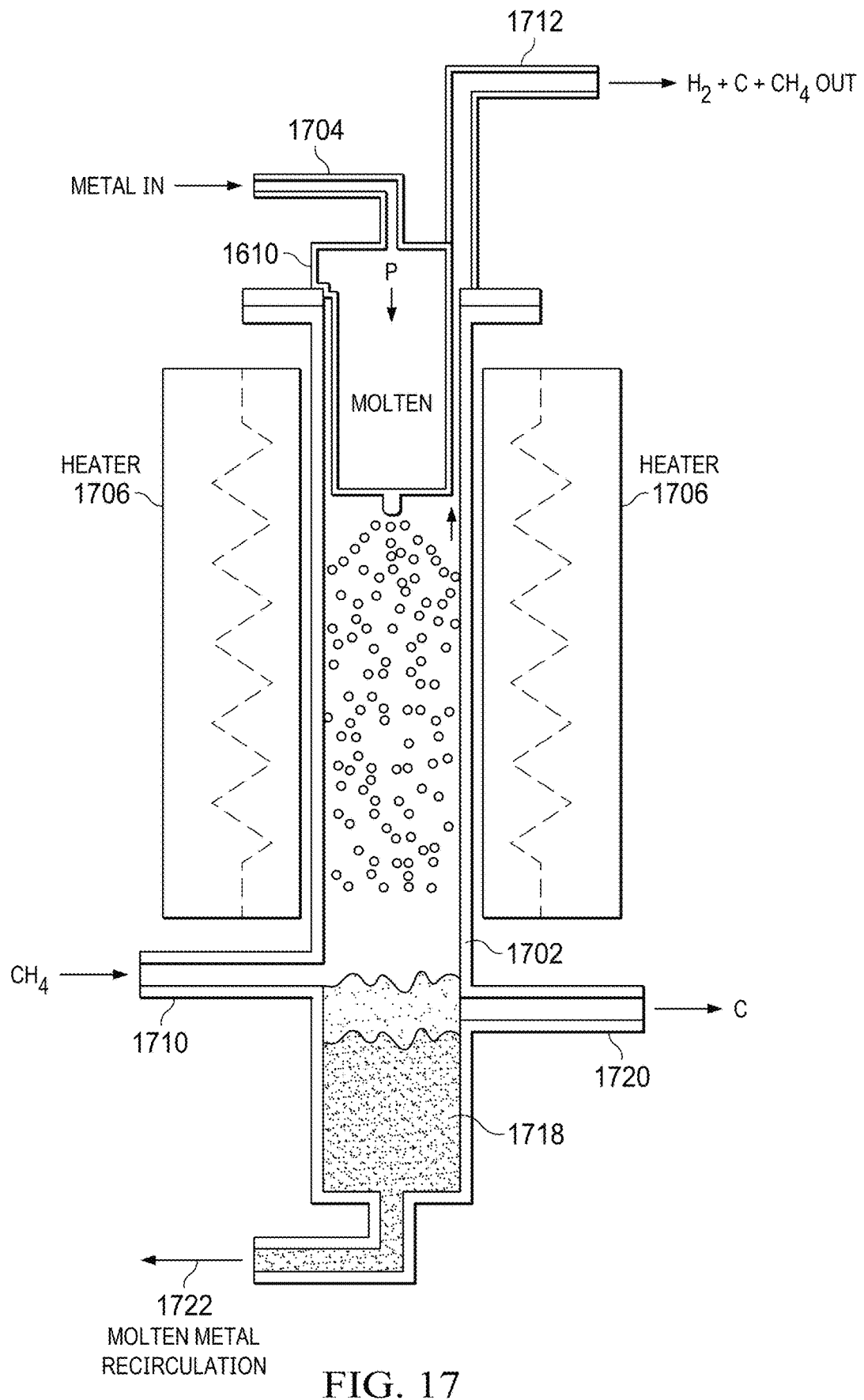
FIG. 17 illustrates another embodiment of a hydrocarbon pyrolysis reactor.

Referring now to FIG. 17, there is illustrated an alternate embodiment utilizing a liquid mist reactor. In this embodiment the liquid catalyst may already reside inside the reactor vessel in a reservoir 1702. In addition to the nozzle 1612, the liquid catalyst is continuously recirculated through and inlet 1704 and converted into a mist within the chamber 1702. Additional pressure may be added through the use of a diaphragm located outside the heated zone, such that the gas is not in contact with the liquid catalyst. External heaters 1706 operate to keep the reactor vessel at a uniform temperature, typically between 600° C. and 1100° C., or between 1100° C. and 1400° C. The methane or other hydrocarbon gas enters the chamber through the second inlet 1710 and upon generation of the output gas, which may include entrained solid carbon, some of the carbon exits the system through the outlet 1712. The output product may include unreacted methane, which is captured in a PSA bed and recirculated through inlet 1710.

In one embodiment, the reactor 1702 may include augers, rotary or gravimetric separators to remove the carbon product layer that gravimetrically settles on top of the pool of liquid catalyst 1718. The carbon would be removed through outlet 1720 and the system include high temperature ceramic gear pumps or electromagnetic pumps to recirculate liquid catalyst at 1722. The temperature of operation of molten metals is intended to be maintained between 650° C. and 1400° C. The embodiments of FIG. 16 and FIG. 17 are described in more detail in U.S. Pat. No. 11,453,584, which is incorporated herein by reference in its entirety.

Figure 18:
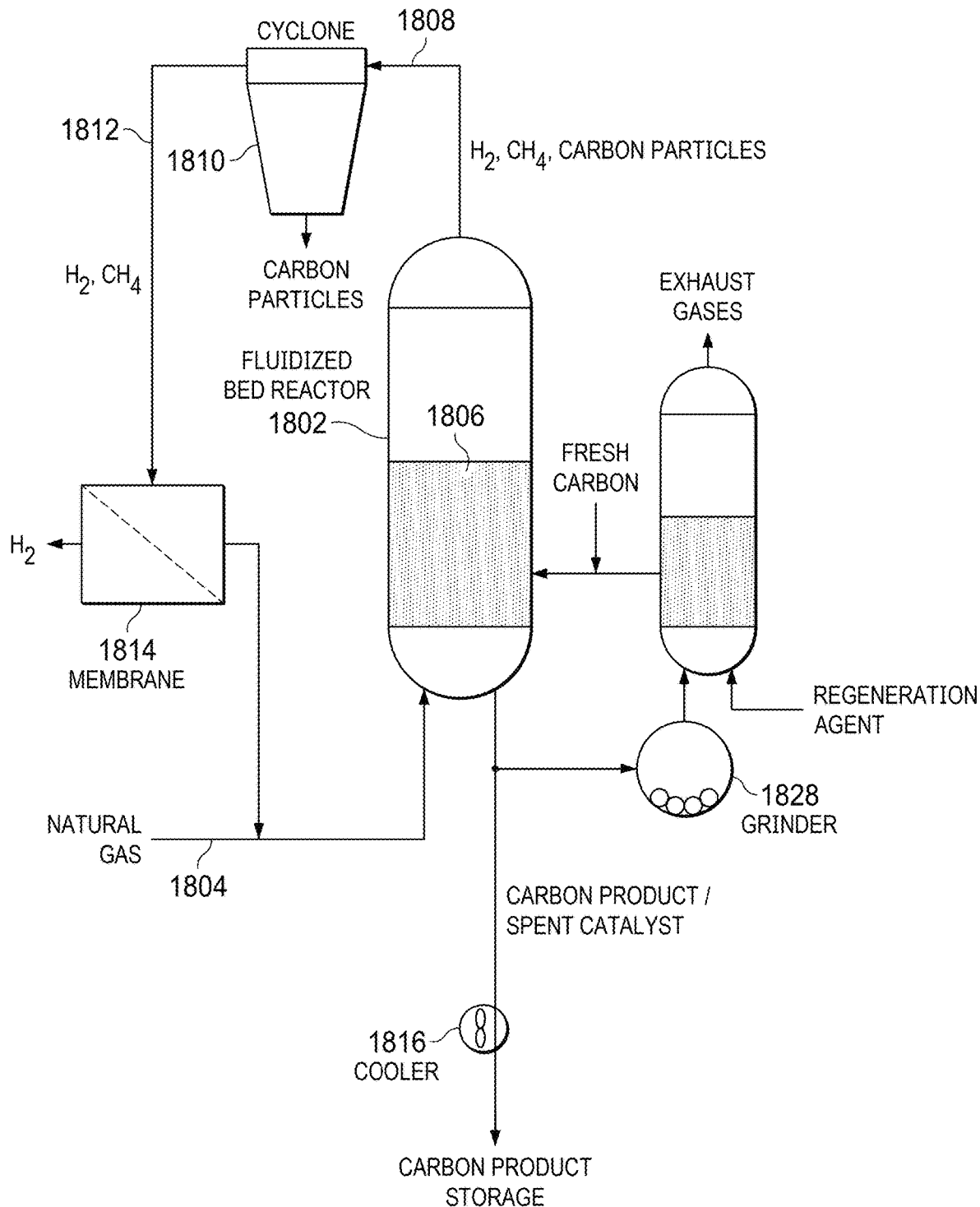
FIG. 18 illustrates a pyrolysis system using a fluidized bed reactor.

Referring now to FIG. 18, there is illustrated a block diagram of a pyrolytic fluidized-bed reactor 1802. A fluidized bed reactor 1802 is provided that receives on the input at the bottom thereof a natural gas input on a line 1804. The outlet gas is provided on an outlet 1808 at the top of the reservoir 1802. This outlet gas, which is composed of unconverted methane and hydrogen and carbon particles, is pass-through a cyclone 1810 in order to remove the possible entrained carbon particles. The output of the cyclone 1810 is basically the hydrogen and methane on a line 1812, which is input to a membrane 1814 to separate methane and hydrogen. The recovered methane is recirculated and fed back to the reactor 1802 on the input line 1804. The carbon catalyst and carbon deposits are collected at the reactor 1802 bottom, cooled with a cooler 1816 and then stored. A small part of the carbon product can be introduced into the reactor 1802 after grinding with a grinder 1828 and/or reactivation of a regeneration method.

Figure 19:
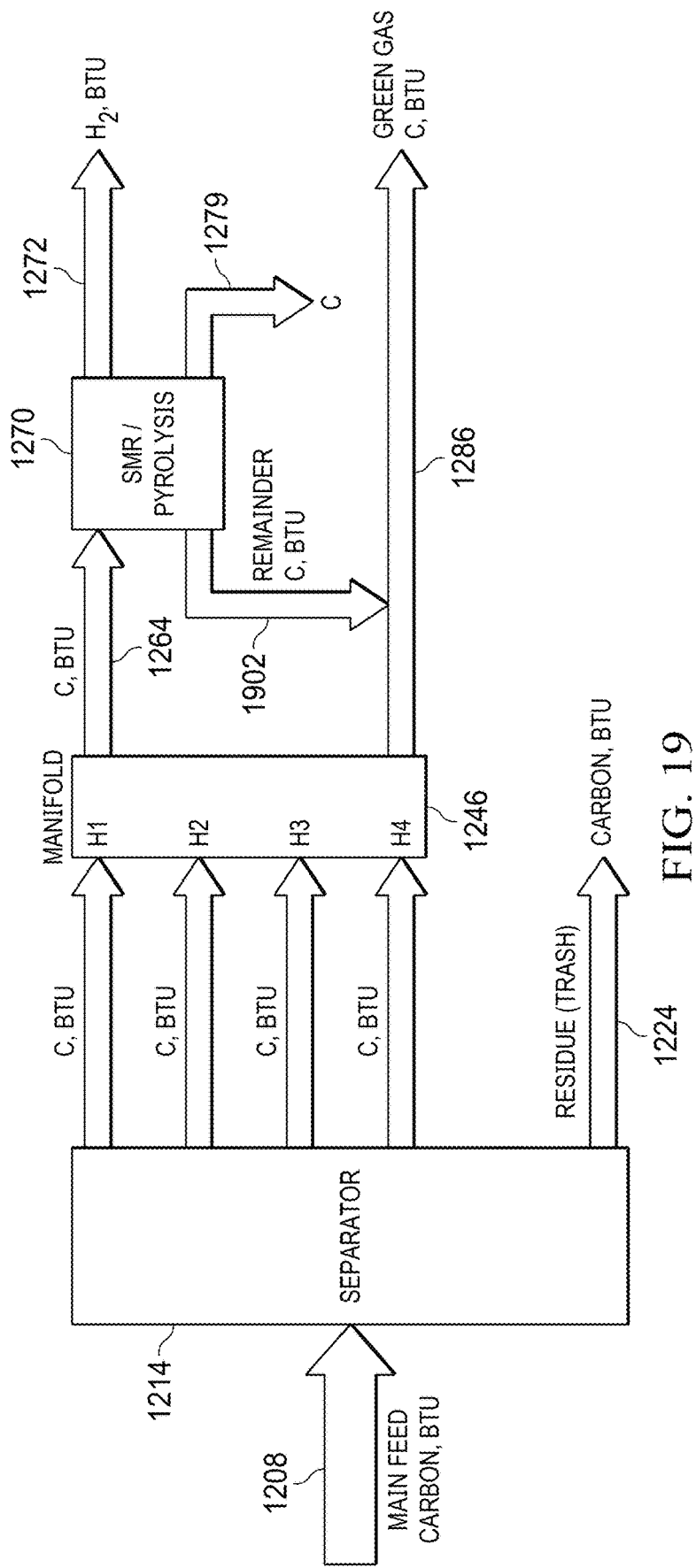
FIG. 19 illustrates diagrammatic view of the embodiment of FIG. 12 illustrating the flow of gas for a defined unit.

Referring now to FIG. 19, there is illustrated a diagrammatic view of the embodiment of FIG. 12 illustrating the flow of gas for a defined unit. As noted hereinabove, the system presently disclosed utilizes a single "unit" of natural gas as a baseline. In the oil and gas industry, the most widely used management for quantifying the energy content of natural gas is the British thermal unit (Btu), representing extended unit for measuring heat energy. MMBtu represents a one million Btus, reflecting the energy generated by burning one million British thermal units in gas. There are a number of ways of determining what the heat energy is for any unit volume of natural gas that is received. The first is to just assume the makeup of natural gas and the determine the volume required to generate the single MMBtu. This, as described hereinabove, can be accurate because the exact makeup of the natural gas into any pipeline can vary from the pipeline to pipeline and from time-to-time for a given pipeline. With this present disclosure embodiment, an exact measurement of a MMBtu is achieved of. This utilizes the method of actually measuring and determining the makeup of the natural gas, determining what volume is associated with a single MMBtu and then tracking this single MMBtu through the system of.

Referring further to FIG. 19, the main gas is received on the input feed line 1208. As described above, this is analyzed such that it is known what volume constitutes a single MMBtu. At this point, the energy amount of this MMBtu is known, that being one million Btus and the "trash" makeup of that single MMBtu is known which allows the system to have knowledge of what constitutes the received Carbon content that is actually present in the received MMBtu. This feed line, as described hereinabove, is fed into the separator 1214. Because each point in the overall feed of any gas is known, the Carbon content and the Btu content of each separated gas will be known. This will be associated with the received MMBtu gas. Since each gas proceeds to the separator 1214 at a different speed due to the distillation process, there will be delays for each gas. In real time, a single received MMBtu will be associated with the separated gases at different times. This will be illustrated in a later figure.

Each of the separated and desired hydrocarbons, H1, H2, H3 and H4, are input to the manifold 1246. This manifold 1246, as described hereinabove, is operable to either output all of the received gases to the green gas feed 1286 or select one of the feed lines for input to the SMR/pyrolysis process 1270. At this point, both the carbon content and Btu level will be known because it is measured. In the SMR/pyrolysis process 1270, one hundred percent of the received and selected hydrocarbon on the input feed 1264 will seldom be converted due to the efficiency of the system. Therefore, the resultant remainder can be returned on a feed line 1902 to the green gas line 1286 or back to the feed line 1264. At a point though, the amount of the gas that is returned, the Carbon content thereof and the BTU content thereof is known.

In this process, by accounting for the delays, each MMBtu that flows into the system can have the actual constituents that make up that received MMBtu of gas tracked by the system such that the resultant energy output as green gas or hydrogen will be known. Additionally, the residue or trash gas output on the feed line 1224 from the separator 1214 is known also. Since the trash gas comes out after the desired hydrocarbons have been distilled, it will be the last output of the separator 1214. Thus, the flow illustrated in FIG. 19 will not be "real-time." However, the system can be designed such that the feed lines between any two points in the system could be extended such that all of the desired hydrocarbons enter the manifold 1246 at the same time. In this manner, the analysis of each of the separated and desired hydrocarbons can be measured at the same time as well as that of the trash gas on the line 1224. Since these are all synchronized, the measurements after the manifold 1246 will be synchronized. However, the overall central controller 1236 can determine the delay time to the system, as this is a fixed system, to account for the delays. This, of course, will result in the green gas on the output of the line 1286 being mixture of separated and desired hydrocarbons from different MMBtu "units." However, since it is known which desired hydrocarbons are being routed to the green gas feed line 1286, this is just commingling of gases. The important aspect of the tracking is to know the makeup of the gas that is being returned to the green gas feed 1286. Since the hydrocarbons are buffered in tanks in the manifold 1246, the gas will be commingled between received and then BTUs. However, in real-time, each MMBtu is buffered in a tank in the manifold 1246 and flows through the system. Therefore, the amount of carbon and energy recovered from these selected desired hydrocarbon processes by the SMR/pyrolysis process 1270 is known. This thus allows the central controller 1236 to determine the common content and the energy content of a received MMBtu, the amount of and the makeup of the trash gas extracted therefrom in addition to the amount of Carbon energy in that received MMBtu "unit" that was process through the manifold 1246 and directed either to the SMR/pyrolysis process or output as green gas.

Figure 20:
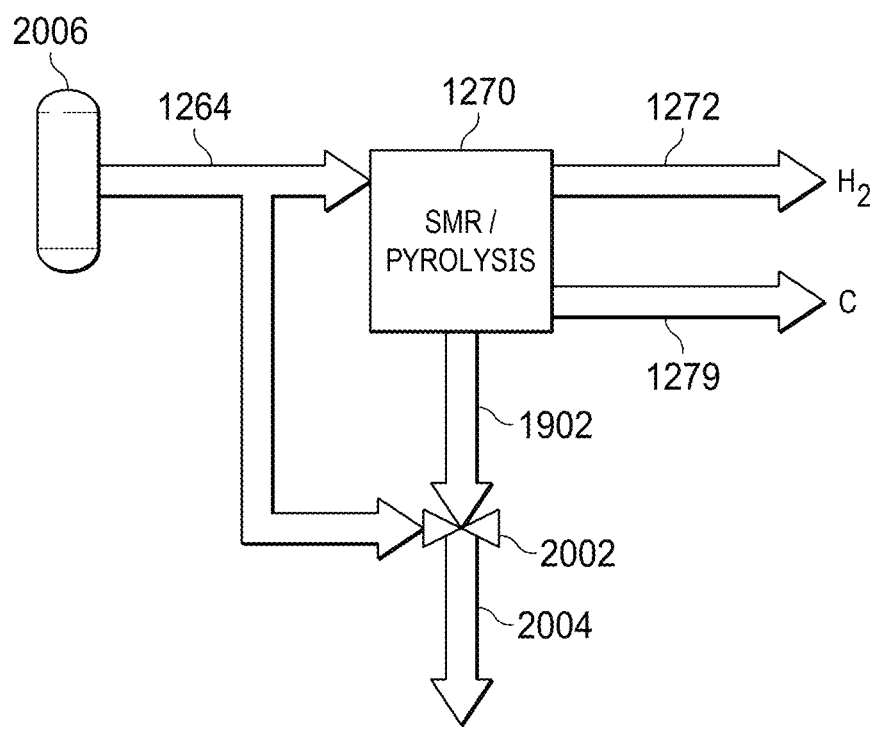
FIG. 20 illustrates a simplified diagrammatic view of the feed path of the remainder gas from the SMR/Pyrolysis process.

Referring now to FIG. 20, there is illustrated a simplified diagrammatic view of the feed path of the remainder gas from the SMR/Pyrolysis process 1270. The remainder gas is output to a valve 2002 in order to either send this out to a feed 2004 to the green gas feed 1286 or to route it back to the input feed 1264 to the SMR/Pyrolysis process 1270. The feed 1264 is illustrated as coming from a tank 2006, this being a buffer tank. This buffer tank 2006, in a real-time process, is designed to buffer a separated and selected hydrocarbon from a received MMBtu as a single unit such that makeup of that selected portion of the received MMBtu is known. At this point in the process, the amount of the selected hydrocarbon that is processed by the SMR/Pyrolysis process 1270 is known. Of course, any return gas from the process will have to be analyzed and calculated if it is combined with a portion of a MMBtu processed subsequently.

Figure 21:
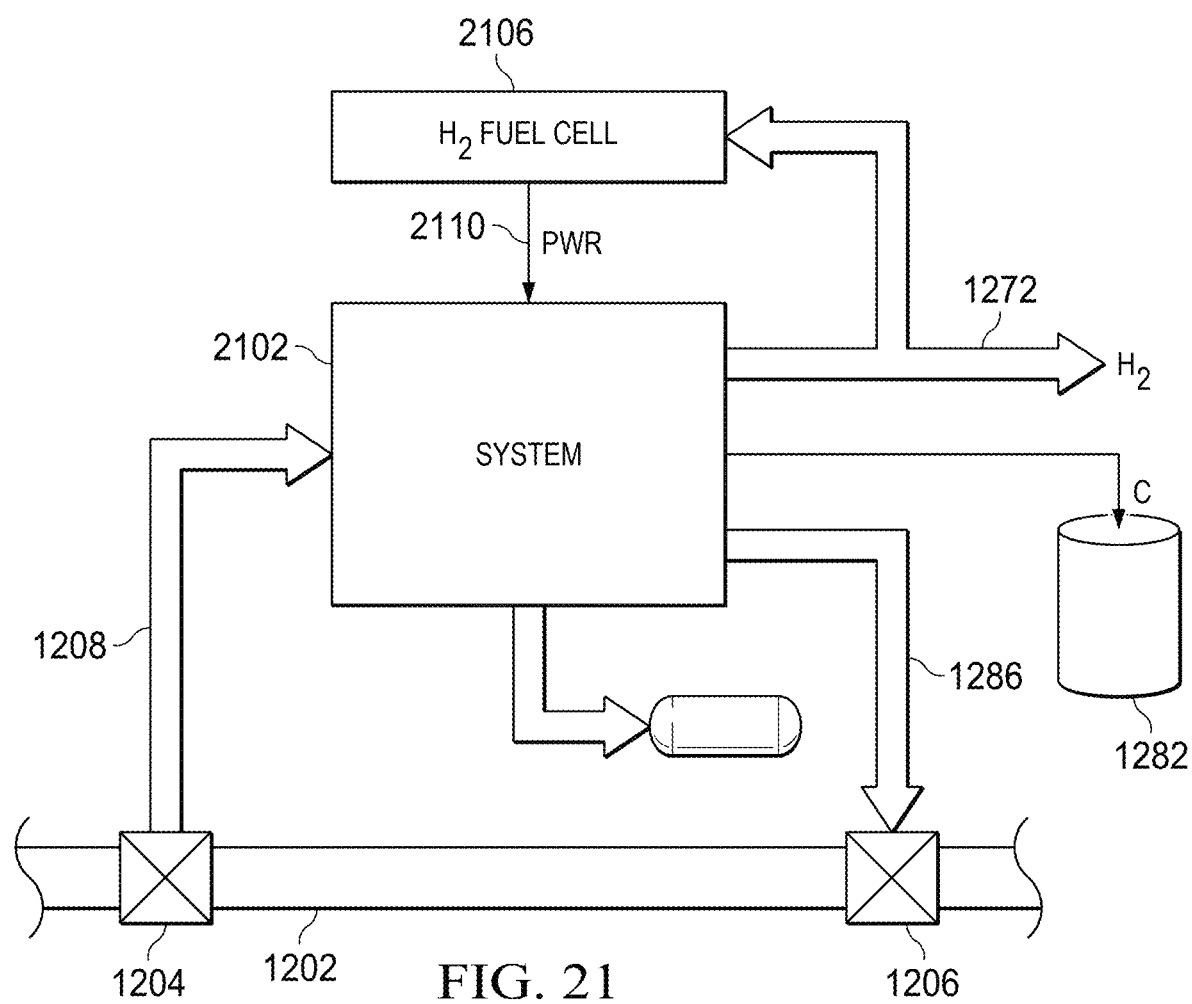
FIG. 21 illustrates one embodiment of how the system can be energized.

Referring now to FIG. 21, there is illustrated one example of how the system can be energized. Since the system is operable to generate hydrogen, the hydrogen can be utilized to power the overall system. In FIG. 21, the system is illustrated as a system 2102. Here a hydrogen fuel cell generator 2106 is provided that receives hydrogen as an input from the feed 1272 at the output of the system 2102 to generate power on an input 2110.

Figure 22:
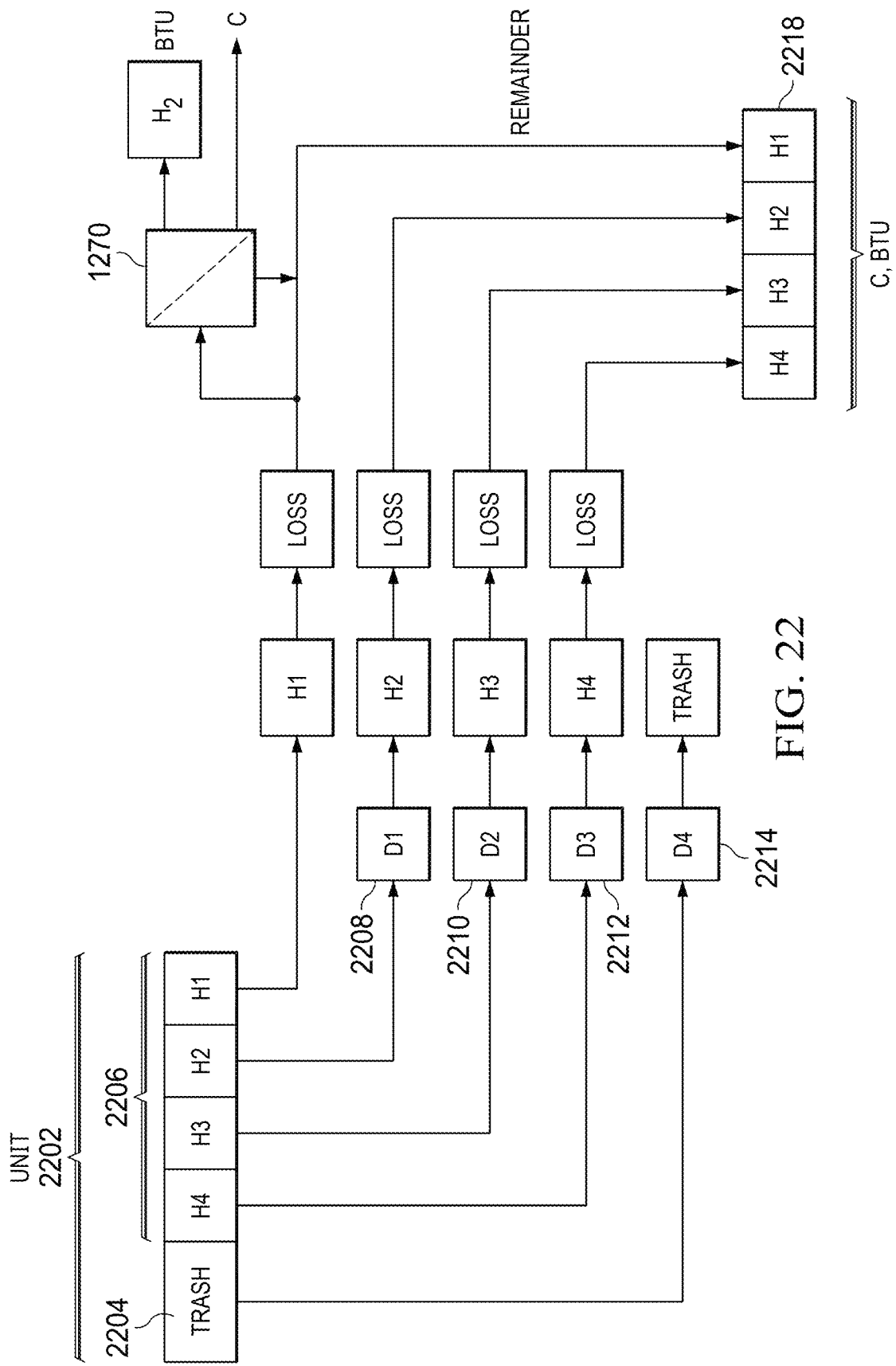
FIG. 22 illustrates a diagrammatic view of the delay associated with translating a received unit MMBtu.

Referring now to FIG. 22, there is illustrated a diagrammatic view of the delay associated with translating a received unit MMBtu 2202 which is comprised of trash gas 2204 and desired hydrocarbons 2206, H1, H2, H3 and H4. They are divided out by the separator 1214 and processed through the system. The lightest and first gas that will be distilled or provide a reference by delay. Each of the remaining desired hydrocarbons have a delay 2208, 2210 and 2212, respectively associated therewith. In this embodiment, that will result in all of the desired hydrocarbons being synchronized. In addition, there will be a delay 2214 associated with the trash gas. If all of these delays are accounted for, the actual makeup of each of the desired hydrocarbons and trash gas will be known for that received MMBtu unit 2202. Thereafter, one of the hydrocarbons will be selected for processing by the SMR/Pyrolysis process 1270 to produce the hydrogen. Associated with the overall process would arguably be some loss along the way. Thus, the makeup with respect to the amount of carbon and hydrocarbon that is processed is required to be known to the system from the input to the output. Thus, at a certain molecular weight of methane, for example, were determined to be present in the received MMBtu unit, the amount of methane that is actually separated from the received MMBtu unit needs to be known. The losses associated with the processing of that known amount of methane are accounted for by measuring the actual molecular makeup of the methane gas that goes into the SMR/Pyrolysis process 1270. Thereafter, the amount of hydrogen that is produced and the Carbon that is extracted can be exactly measured. The amount of methane that is not processed by the SMR/Pyrolysis process 1270 will be known, such that it is known how much of that is returned as green gas. Since, in a real-time process, all of the buffered and unselected hydrocarbons will be returned as green gas. Thus, it will be known that there will be a unit 2218 of the green gas that is returned to the natural gas line that will be uniquely associated with the MMBtu unit that is received and this exact quantity of green gas can be correlated directly to the received MMBtu unit of. With this process, the amount of trash gas that is removed from the green gas can be determined, the amount of hydrogen and Carbon removed from the selected hydrocarbon in the SMR/Pyrolysis process 1270 can be known and the amount of Carbon removed in the trash gas can be known. This information is known and determined for each MMBtu and this can be certified as the operation of the system is well-known and calibrated. This, of course, can be done for each selected hydrocarbon, whether it be methane, butane, ethane or propane.

In processing gas to the system, the flow of natural gas to the system can be adjusted in order to anticipate the desired output hydrogen over a given period of time, such as a day. As noted hereinabove, there is a desire to regulate this amount of produce hydrogen so as not to be classified at a higher industrial level. In general, an MMBtu of natural gas will yield approximately 6 kg of hydrogen. This, of course, assumes that the natural gas is uniform, which is not the case. The desire is to receive that MMBtu of natural gas, extract one of the desired hydrocarbon therefrom and to determine exactly how much hydrogen is actually extracted therefrom. Additionally, the exact amount of Carbon that is removed from that desired hydrocarbon can be determined in addition the exact amount of Carbon that was delivered back to the pipeline in the form of green gas. Of course, this green gas is a cleaned up version of the initial natural gas process, as the trash gas has been removed. In the removal of this and trash gas, it is known how much Carbon is contained in the trash gas. Thus, the input Carbon content is known, the input Btu content is known (one MMBtu as a base reference), the amount of Carbon Powder that is recovered in the SMR/Pyrolysis process and the amount of Carbon that is contained in the green gas returned to the natural pipeline. By accounting for the losses, the total amount of Carbon captured from the input natural gas line can be determined by actual measurement. In this manner, a verified account of each unit of natural gas process can be provided. It should be understood that, when natural gas is fed into the system, each MMBtu may defend in over a time period of thirty seconds to sixty seconds. Since the makeup of the natural gas does not change that quickly, the makeup need only be sampled at certain intervals that may track over multiple MMBtu units. However, it is the MMBtu unit that is tracked. It may be that ten MMBtu units have the exact same processing makeup. However, each MMBtu will have a different time stamp and, therefore, will be unique to that and then the exact amount of Carbon and hydrogen extracted may actually be the same for each MMBtu in that close association of received MMBtus, but they are each verified.

The Unique Identifier Code (UIC), as noted hereinabove, is used to track an item, entity, or service for treatment as a certification or bankable fungible asset by ensuring authenticity, traceability, and standardization. The item that is tracked is the MMBtu. The UIC serves as a digital fingerprint that links the item to a verified database, allowing for secure verification, ownership records, and compliance tracking. For example: Documentable and Traceable Certificates of Carbon or Carbon Assets, and their property rights and their derivatives. In the system described herein creates physical assets such as fundamental chemical elements, for example carbon assets and the green gas, and/or digital articles of commerce such as certificates or tokens which track and trace origins and transfer of various physical and digital assets. These assets can manage, administer or traded within a DEX or held, swapped, stored, managed, secured and traded in various forms of digital token-based electronic barter, exchange or payment systems and can be used as a way to reenforce and or authenticate credentials, regulatory approvals, or compliance records, including tokenized commodities, carbon credits, or digital securities.

Referring further to FIG. 19, the monitoring of a particular MMBtu for verification, analysis thereof and the use in building any particular UIC will be described. As noted hereinabove, each UIC is associated with a "unit" of natural gas. For exemplary purposes, this unit is set as an MMBtu. As also described hereinabove, a typical MMBtu of a typical gas makeup for natural gas yields approximately 6 kg of $H_2$. But that actually depends upon how much of the natural gas is directed to the hydrogen generating process, how much is extracted trash gas and how much is returned as green gas. But the first step is to determine what volume of natural gas contains a single MMBtu. Since the natural gas can be derived from multiple sources, the actual makeup of the natural gas is not exactly known. The typical industry standards just utilize some industrial standard for natural gas that approximates the volume of a single MMBtu. However, as be described in more detail hereinbelow, it is important that each unit associated with a UIC is associated with an exact unit of energy or a single MMBtu as in the example described hereinbelow. To the first step of processing and monitoring the amount of natural gas processed in the system is to determine what the volume of received natural gas correlates to a single MMBtu. Typically, a plant may be designed to generate 720 kg of $H_2$ per hour that, for 6 kg/MMBtu would require one MMBtu's per hour to flow through the system. However, depending upon the processed settings and the content of a single MMBtu, each MMBtu may only result in 5.9 kg/MMBtu processed. If there is a maximum amount of hydrogen that can be generated per hour or per day for the system, knowing the exact content of the gas through each flow point in the system will allow the central controller to control the flow of natural gas into the system.

As noted, the first step is to determine what volume of gas received in the natural gas input contains a single MMBtu. Once his volume is known, a timer can be initiated at the beginning and the end of each MMBtu received. This is effectively a time slot. This particular time slot can be tracked through the system. What is important is to determine how much green gas, $H_2$ and elemental Carbon (powdered Carbon) is derived from that particular MMBtu. For example, the separated as noted hereinabove acquires distillation processes. If the methane, the lightest gas, is selected for processing into $H_2$, the manifold 1246 would select the $H_1$ gas feed, i.e., methane. This result in methane the input to the SMR/pyrolysis process block 1270. This will result in the output of $H_2$ and Carbon. For verification purposes and tracking of this single finite and unit of gas, i.e., the MMBtu, and inclusion in the UIC, it is important to know for this particular slot of time within which that single or unit of MMBtu is received exactly how much of the green gas associated with that particular slot of time is generated, exactly how much Carbon is generated and how much $H_2$ is generated.

To calculate this, the following example illustrates such. Suppose that it is determined for known flow rate that an MMBtu full entered the system between times $t_1$-$t_2$. This results in a Ain the amount of time required receive a single MMBtu (Unit). This Unit will then be processed through the separator 1214 resulting in a new delay Ami associated with the first gas feed path for methane at this point, the methane gas is input to the manifold with the following delay:

$$\Delta_{in}+\Delta_{H1}$$

The selection process of the manifold of the H1 feed path for input to the SMR/pyrolysis processing block 1270 will result in a delay of AManifold resulting in a total delay:

$$\Delta_{in}+\Delta_{H1}+\Delta_{Manifold}$$

The SMR/pyrolysis process block 1270 will have a first delay ASMR/P/H2 for processing the H2 gas and a second processed delay $A_{SMR/P/C}$ for processing the powdered Carbon to result in the following equations:

$$\Delta_{in}+\Delta_{H1}+\Delta_{Manifold}+\Delta_{SMR/P/H2}\rightarrow H_2$$

$$\Delta_{in}+\Delta_{H1}+\Delta_{Manifold}+\Delta_{SMR/P/C}\rightarrow C$$

For this process, the gas must flow in a continuous flow with little or no buffering. It can be stored in a tank, but that tank has to be representative of a constant flow rate. Further operations, such as long-term storage of a particular separated gas or for converting the gas to green gas, the larger storage buffer tanks can be utilized. However, for each selected gas, the process flow must be direct. As such, there will be a direct bypass for any buffer tank, although this is not shown. At this point in the monitoring process, the system has knowledge of the entire content of the original input MMBtu, i.e., the Unit, for the given input slot across Ain and exactly how much hydrogen and carbon is extracted after the processing delay. Thus, what is required to be known is the amount of hydrogen $H_2$ that is processed from:

$$t_1 + \Delta_{H1} + \Delta_{Manifold} + \Delta_{SMR/P/H2}$$

to:

$$t_2 + \Delta_{H1} + \Delta_{Manifold} + \Delta_{SMR/P/H2}$$

This will give the amount of hydrogen generated during this period including all delays. Similarly, the amount of carbon processed for this Unit will be:

$$t_1 + \Delta_{H1} + \Delta_{Manifold} + \Delta_{SMR/P/C}$$

to:

$$t_2 + \Delta_{H1} + \Delta_{Manifold} + \Delta_{SMR/P/C}$$

This provides the delays, but it is also necessary to know how much of the gas during this period is actually processed. At the end of the process, the actual amount of hydrogen and carbon can be determined. The amount of hydrogen can be measured by measuring the volume and the purity during that time period and the amount of carbon generated can be weighed. Depending upon the process used, the Carbon can be weighed in real time. For example, if a catalyst is utilized in the pyrolysis process, the actual change and the weight of the catalyst can be measured as carbon builds up on the catalyst.

For the green gas output, each separated gas will be separated and stored in a particular tank and the amount thereof can be measured. Therefore, the amount of gas generated for each of the separated gases will be measured over the delays as follows:

$$\Delta_{in} + \Delta_{H2}$$

$$\Delta_{in} + \Delta_{H3}$$

$$\Delta_{in} + \Delta_{H4}$$

$$\Delta_{in} + \Delta_{Trash}$$

The total delay for determining the amount of green gas and Trash gas that is generated from nonselective and separated gases for the $H_2$ generation process can be determined at the end of the entire operation of the separator 1214, that being when the trash gas is generated. Each of the separated hydrocarbon gas in the trash gas, that are not selected for the SMR/pyrolysis process in the block 1270 will be designated as being green gas. Therefore, it is not necessary to determine how much gas is actually output from the manifold 1246 to the green gas feed 1286 because it is all designated to be green gas. Additionally, the amount of the remaining hydrocarbon gas that is not processed in the SMR/pyrolysis processing block 1270 on the feed line 1902 is also designated as being associated with green gas. Thus, all that is necessary is to determine how much of the separated gas is input to the manifold 1246 for storage. For example, for the $H_2$ feed from the separator 1214, it is only important to determine the amount of gas that is generated from:

$$t_1 + \Delta_{H2}$$

to:

$$t_2 + \Delta_{H2}$$

This subject is of the gas $H_2$ feed is then determined and designated as being associated with green gas. Since it is known that this designation exists, is not necessary to know what was actually output to the green gas feed 1286. In other words, the gas does not have to be synchronized for output to the time slot as being delayed. The amount of the gas generated is known and, thus, the total amount of gas not designated for the SMR/pyrolysis process is known. Thus, this gas can be stored in a buffer tank for delayed delivery to the natural gas line.

Thus, referring back to FIG. 14, the UIC can be generated by knowing the initial time $t_1$ that the process was started, i.e., the beginning of the Unit. Since it is known that this is for a single MMBtu, the actual volume does not need to be known, as the constituents measured therein will provide that volume. Thus, all other constituents will be measured for that Unit. As described hereinabove, it should be understood that the content of a natural gas feed does not change all that fast. Therefore, it is only required to measure the makeup of the natural gas periodically over potentially many MMBtu's. Once the makeup of the natural gas is understood, then the volume of gas that makes up an MMBtu can be determined such that the volume is the exact volume that is associated with an exact single MMBtu. This volume can vary, depending upon the presence or absence of the heavier hydrocarbons, the presence of carbon dioxide, etc. Once processed, the exact amount of hydrogen in field 1416 will be the exact amount extracted from that Unit associated with fields 1406-1412 and in the UIC associated with that Unit.

Although the description above has been described with respect to the time, it should be understood that the time slot Ain associated with the single MMBtu Unit defines the contents of that MMBtu that is being certified and associated with a particular UIC. Thus, what is important is to determine the "amount" of hydrocarbon that is processed and Carbon that is extracted, this and the amount of trash gas that is extracted. Thus, the initial "amount" of each of the constituents is determined and then all the constituents separated and each processed individually. Therefore, it is the amount that is being processed that is important in this has to be translated to time. This example, if methane, CH4, is being processed, its molecular volume is determined which can be translated to the molecular weight of Hydrogen and Carbon. For example, if the molecular volume of methane in the unit is determined to be "X," it is a necessary to determine how much of the Carbon and Hydrogen this actual volume X will be processed into $H_2$ and powered Carbon. Since this is a calibrated system for the purpose of certifying the system, all the processes and this in the associated delays are known. As such, this volume, X has to be tracked to the system. The first process will be to go through the distillation process 1014 illustrated in FIG. 10. Over the Ain associated with the Units, the molecular volume X for the methane gas present in that Unit has to be tracked. Thus, knowing the operational parameters and characteristics of the distillation tower 1014, the amount of that volume X can be tracked to the output of the cooler 1034. Although the output of the cooler 1034 is illustrated as going to a storage tank 1032, this is a real-time process for the selected gas for the SMR/pyrolysis process and, therefore, this would just be input to the manifold. Thus, the volume X that is extracted from the natural gas feed by the distillation tower 1014 can be determined. Of course, it should be understood that the actual volume X that was measured as being part of the natural gas feed for the methane gas may have some loss associated there with based upon the distillation process. Thus, the actual volume output may be, for example, 0.95λ. At this action represents the methane that without by the distillation process. This is then input to the manifold 1246, and this process may actually result in some loss also such that the amount of the original volume X of methane gas is now 0.90λ. This will then be input to the SMR/pyrolysis processing block 1270 with an additional loss resulting in only 0.089× of the original volume X of the methane gas being input to the SMR/pyrolysis process. But this action correlates to the original volume that was process. The SMR/pyrolysis process block 1270 will then process the received methane gas, CH4, in order to separate the Carbon from the Hydrogen. Ideally this will result in powered Carbon and $H_2$. But these processes have certain losses. First, the SMR/pyrolysis process will result in $H_2$, Carbon and CH4 in addition to some loss. This loss is result of the elemental Hydrogen and Carbon combined with oxygen to produce $CO_2$, for example. The object is to actually determine the exact amount of the Carbon and $H_2$ extracted from the initial actual volume X of CH4. Thus, it is important to know how much of this actual volume X of $CH_4$ has been processed and converted into Carbon and $H_2$. If the losses were not accounted for and all that was process was a volume equivalent to the actual volume X in the Unit, then some methane from a follow-on and subsequent Unit would be contained as part of the process. In order to provide a certification that the Carbon in the Hydrogen gas that was received is the actual carbon that was in the initial Unit, it is important to be able to track that particular volume X of $CH_4$ through the system and account for all losses, etc. In order to achieve such a result, all of the losses need to be accounted for and all of the delays to the system need to be accounted for.

It should be understood that this is a continuous flow system and, as such, one Unit of gas will follow a previous Unit of gas. There will, of course, be some commingling at the boundaries. Thus, there will be a confidence factor or accuracy that will have to be accounted for. Thus, since it is possible to actually separate that initial actual volume of $CH_4$ from the continuous feed, it is possible that some co-mingling will exist at the boundaries. It may be that a confidence factor of 0.98 to be attributed to any Unit based upon the calibration and history of the system of. Each and every process is associated with the processor, including all delays and losses, can be modeled and measured. By having knowledge of the molecular makeup of the feed for each process flow, the actual Carbon and Hydrogen that is present in the initial MMBtu that makes up the Unit can be determined, the actual constituents in the Trash gas that is present in the initial MMBtu that make up the Unit can be determined and then the amount of Carbon and other constituent and that is "actually" removed as a part of the Residue can be determined in addition to the "actual" amount of Hydrogen gas, $H_2$, generated and "actual" amount of powdered Carbon removed from the initial MMBtu can be determined. Additionally, the molecular volume of the remaining Hydrocarbons that were separated from the initial Unit and returned as green gas can be determined. Since this is the actual measured amount, this provides and improve quantitative determination of the overall processing operation.

In order to create the unique UIC as a digital certificate to reflect the processing of a single MMBtu through the system, there are a number of things that are required. First, it is necessary that the overall system that tracks a processing from the initial received MMBtu of natural gas, i.e., the "Unit," to be a certified system that can accurately measure and record the recovered Carbon from both the processed desired hydrocarbon that is utilized to generate the hydrogen, $H_2$, gas (this is the powdered Carbon) and the Carbon captured from the Trash gas. It also measures and records the amount of green gas that is returned to the natural gas line with the Trash gas removed, this being referred to as the cleaned-up natural gas.

From a technological advantage, by having knowledge of the amount of Carbon present in a single Unit of received at natural gas, a single MMBtu in the disclosed example, knowledge of the measured amount of Carbon that is present in the Trash gas removed from the Unit and the measured amount of powdered Carbon removed from the desired hydrocarbon gas processed in the SMR/pyrolysis process to recover the hydrogen, $H_2$, gas the UIC can be generated to accurately reflect the actual Carbon extracted from a defined measure of natural gas, i.e., the "Unit," wherein this UIC can be provided as the Carbon certificate. This Carbon certificate is a verified authenticated Certificate that presents a value for the "actual" Carbon removed. To do this, it is asserted to understand exactly how much Carbon was present in a Unit and how much was extracted in addition to knowledge of how much of that extracted Carbon was part of the Trash gas and how much was powdered Carbon. Since separation processes are not 100% complete and there are losses along the way, and it is possible for some of the carbon to have been combined with oxygen in the form of CO or $CO_2$. This will provide a verifiable certificate in the form of the UIC. This is a digitally auditable receipt, and this can be transferred as a digitized asset. For example, if one thousand MMBtus of natural gas were processed, it is possible to generate one thousand Certificates representing how much Carbon was removed from the natural gas. This is a transferable accounting certificate and provide a dynamic Carbon inventory receipt.

In addition to being able to utilize the UIC as a Certificate for tracking Carbon removed from the natural gas, this UIC also provides a Certificate for tracking the amount of green gas that is returned to the natural gas line. As an example, consider that the Unit of natural gas contains one MMBtu of natural gas that is comprised of hydrocarbons and other elements. When this is returned to the natural gas line, the Trash gas, i.e., non-hydrocarbon portion of the natural gas, is removed. In addition, at least a portion of one of the hydrocarbons is removed for processing into hydrogen, $H_2$, gas. The constituent makeup of the green gas is known, such that the system possesses knowledge of how "clean" this returned green gas is. As noted hereinabove, the hydrocarbons that were separated and designated for breach returned as green gas need not be measured as they return to the natural gas line. In general, they are measured as they are stored in buffer tanks, as everything in the buffer tank can be returned. The reason for this is that there are delays in returning the individual separated portions of a given Unit to each feed line that is input to the manifold 1246. It is just necessary to have knowledge that the feeds for the separated hydrocarbons (and was not designated for the SMR/pyrolysis process) are to be returned to the natural gas line as green gas. Each of these separated hydrocarbons is measured to determine the exact and molecular makeup and molecular volume thereof. If, due to processing limitations, some of the Trash gas remains in these hydrocarbon feeds, this or that reflected in the makeup of the green gas. It will be known by the system exactly what the makeup is for each of these hydrocarbons that is tracked through the system from the initial feed of the Unit to the designated buffer tank. This is what is recorded in the UIC. This UIC therefore provides a track of verifiable and certifiable digital certificate for the green gas returned to the natural gas line, i.e., the cleaned-up natural gas.

Key Use Cases:

Certification-A UIC can authenticate credentials, regulatory approvals, or compliance records (e.g., carbon credits, organic certifications, or ISO standards).

Bankable Fungible Asset-When tied to a standardized asset class (e.g., tokenized commodities, carbon credits, or digital securities), a UIC ensures each unit is interchangeable, auditable, and tradable within financial systems.

By leveraging blockchain, smart contracts, or centralized registries, a UIC can enhance transparency, reduce fraud, and enable seamless transactions across markets.

It will be appreciated by those skilled in the art having the benefit of this disclosure that this system and method for processing natural gas to remove carbon and produce hydrogen. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for tracking processing of natural gas through a hydrogen generation system, comprise the steps of:
    connecting the hydrogen generation system to a natural gas main line to receive the natural gas therefrom;
    controlling a flow of the natural gas received by the hydrogen generation system from the natural gas main line;
    segmenting the flow of the natural gas into a predetermined unit of received natural gas (Unit) for tracking of the Unit through the hydrogen generation system, the Unit comprised of hydrocarbons of different weights and non-hydrocarbons, which non-hydrocarbons constitute trash gas;
    the step of segmenting including:
        measuring a constituent makeup of the received natural gas to determine a molecular structure and a molecular weight of each constituent that is contained within a natural gas flow associated with the Unit, and
        determining a volume of the received natural gas that constitutes the Unit based upon a measured amount of the molecular structure and the molecular weight of each constituent required to define the Unit;
    separating from the Unit select ones of the hydrocarbons contained therein and measuring the molecular weight of each of the separated select ones of the hydrocarbons;
    separating from the Unit all remaining non-selected ones of the hydrocarbons and the non-hydrocarbons and determining the molecular structure and the molecular weight of each constituent in this step of separating;
    inputting the separated select ones of the hydrocarbons associated with the Unit to a manifold, the manifold operable to:
        selecting one of the separated select ones of the hydrocarbons associated with the Unit as a desired hydrocarbon for processing to separate hydrogen and carbon from the desired hydrocarbon to form hydrogen gas, H2, and elemental Carbon in a hydrogen generation process, and
        designating for return to the natural gas main line as green gas others of the separated select ones of the hydrocarbons associated with the Unit not selected as the desired hydrocarbon, which the green gas does not contain the non-hydrocarbons associated with the Unit;
    processing at least a portion of the desired hydrocarbon associated with the Unit output by the manifold associated with the Unit to separate Hydrogen and Carbon atoms into the hydrogen gas, $H_2$, and the elemental Carbon;
    measuring a molecular volume of the hydrogen gas, $H_2$, associated with the Unit;
    measuring the molecular weight of the elemental Carbon associated with the Unit; and
    directing with the manifold the separated select ones of the hydrocarbons associated with the Unit not including the desired hydrocarbon associated with the Unit to route the directed separated select ones of the hydrocarbons associated the Unit to the natural gas main line and wherein the molecular volume of each of the directed separated select ones of the hydrocarbons associated with the Unit is measured.

2. The method of claim 1, wherein the flow is controlled as a function of a desired output of the hydrogen gas, $H_2$ over a defined period of time.

3. The method of claim 1, wherein the step of segmenting defines the Unit as a based on energy in the segment being set to a finite value.

4. The method of claim 3, wherein the finite value is a multiple of one thousand BTUs of the energy (mmBtu).

5. The method of claim 3, wherein the finite value is one mmBtu.

6. The method of claim 3, wherein the step of determining the volume of the received natural gas that constitutes the Unit comprises determining a volume wherein the hydrocarbons associated therewith yield the finite value of energy.

7. The method of claim 1, wherein the step of separating separates all of the hydrocarbons contained in the Unit.

8. The method of claim 1, wherein the step of selecting one of the separated select ones of the hydrocarbons associated with the Unit comprises selecting a lightest hydrocarbon of the separated select ones of the hydrocarbons associated with the Unit.

9. The method of claim 8, wherein the lightest hydrocarbon is $CH_4$.

10. The method of claim 1, wherein the step of designating for return to the natural gas main line as the green gas the others of the separated select ones of the hydrocarbons associated with the Unit comprises first buffering the others of the separated select ones of the hydrocarbons associated with the Unit.

11. The method of claim 1, wherein the elemental Carbon is powdered Carbon.

12. The method of claim 1, wherein the step of processing the desired hydrocarbon associated with the Unit only separates a portion of the desired hydrocarbon associated with the Unit and further comprises returning an unprocessed portion thereof to the natural gas main line after determining the molecular weight and the molecular structure thereof as the green gas.

13. The method of claim 1, and further comprising buffering the separated select ones of the hydrocarbons associated with the Unit directed by the manifold prior to directing thereby.

* * * * *